(12) United States Patent
Gordon et al.

(10) Patent No.: US 8,908,016 B2
(45) Date of Patent: Dec. 9, 2014

(54) METHOD AND SYSTEM FOR PROVIDING THREE-DIMENSIONAL AND RANGE INTER-PLANAR ESTIMATION

(75) Inventors: Eyal Gordon, Haifa (IL); Zeev Zalevsky, Rosh HaAyin (IL); Hamootal Duadi, Ramat Gan (IL)

(73) Assignee: Mantivision Ltd., Petah Tikva (IL)

( * ) Notice: Subject to any disclaimer, the term of this patent is extended or adjusted under 35 U.S.C. 154(b) by 556 days.

(21) Appl. No.: 13/122,633

(22) PCT Filed: Oct. 11, 2009

(86) PCT No.: PCT/IL2009/000965
§ 371 (c)(1),
(2), (4) Date: Apr. 5, 2011

(87) PCT Pub. No.: WO2010/041254
PCT Pub. Date: Apr. 15, 2010

(65) Prior Publication Data
US 2011/0181704 A1    Jul. 28, 2011

Related U.S. Application Data

(60) Provisional application No. 61/136,804, filed on Oct. 6, 2008.

(51) Int. Cl.
| | |
|---|---|
| *G06K 9/46* | (2006.01) |
| *G01B 11/00* | (2006.01) |
| *G06T 7/00* | (2006.01) |
| *G01B 11/25* | (2006.01) |
| *G06K 9/36* | (2006.01) |

(52) U.S. Cl.
CPC ............ *G01B 11/002* (2013.01); *G06T 7/0057* (2013.01); *G01B 11/2509* (2013.01)
USPC .............................. 348/49; 382/154; 382/201

(58) Field of Classification Search
USPC .......................................................... 348/49
See application file for complete search history.

(56) References Cited

U.S. PATENT DOCUMENTS

| 3,619,064 A | 11/1971 | Brooks et al. |
| 4,175,862 A | 11/1979 | DiMatteo et al. |

(Continued)

FOREIGN PATENT DOCUMENTS

DE     10 2005 043 627 B4    6/2012

OTHER PUBLICATIONS

Rafael Piestun et al: "Synthesis of Three-Dimensional Light Fields and Applications", Proceedings of the IEEE, IEEE. New York, US, vol. 90, No. 2, Feb. 1, 2002, XP011 044618, ISSN: 0018-9219.*

(Continued)

*Primary Examiner* — Sath V Perungavoor
*Assistant Examiner* — Howard D Brown, Jr.
(74) *Attorney, Agent, or Firm* — Oliff PLC

(57) ABSTRACT

A system, apparatus and method of performing 3-D object profile inter-planar estimation and/or range inter-planar estimation of objects within a scene, including: providing a predefined finite set of distinct types of features, resulting in feature types, each feature type being distinguishable according to a unique bi-dimensional formation; providing a coded light pattern having multiple appearances of the feature types; projecting the coded light pattern, having axially varying intensity, on objects within a scene, the scene having at least two planes, resulting in a first plane and a second plane; capturing a 2-D image of the objects having the projected coded light pattern projected thereupon, resulting in a captured 2-D image, the captured 2-D image including reflected feature types; determining intensity values of the 2-D captured image; and performing 3-D object profile inter-planar estimation and/or range inter-planar estimation of objects within the scene based on determined intensity values.

54 Claims, 10 Drawing Sheets

(56) References Cited

U.S. PATENT DOCUMENTS

| | | | |
|---|---|---|---|
| 4,357,104 | A | 11/1982 | Davinson |
| 7,333,252 | B2* | 2/2008 | Brotherton-Ratcliffe et al. ............................... 359/21 |
| 7,433,024 | B2 | 10/2008 | Garcia et al. |
| 8,050,461 | B2* | 11/2011 | Shpunt et al. ................. 382/106 |
| 8,090,194 | B2* | 1/2012 | Golrdon et al. ............... 382/154 |
| 8,170,297 | B2* | 5/2012 | Fujiwara et al. .............. 382/118 |
| 8,538,166 | B2* | 9/2013 | Gordon et al. ................ 382/201 |
| 2005/0200927 | A1 | 9/2005 | Brotherton-Ratcliffe et al. |
| 2008/0106746 | A1 | 5/2008 | Shpunt et al. |
| 2008/0118143 | A1 | 5/2008 | Gordon et al. |
| 2010/0074532 | A1 | 3/2010 | Gordon et al. |

OTHER PUBLICATIONS

Levy U et al: "Iterative algorithm for determining optimal beam profiles in a three-dimensional space". Applieo Optics, Optical Society of America. US, vol. 38. No. 32, Nov. 10, 1999. pp. 6732-6736. XP002203722. ISSN: 0003-6935.*
N.G. de Bruijn, "A combinatorial problem," *Proceedings of the Koninklijke Nederlandse Akademie van Wetenschappen*, Series A, vol. 49, No. 7, pp. 758-764, 1946.
B. Julesz, "Towards the automation of binocular depth perception (AUTOMAP-1)," *Proceedings of IFIPS Congress*, pp. 439-444, 1962.
A.W. Lohmann and D.P. Paris, "Binary fraunhofer holograms, generated by computer," *Appl. Opt.*, vol. 6, No. 10, pp. 1739-1748, 1967.
H. Takasaki, "Moirétopography," *Appl. Opt.*, vol. 9, No. 6, pp. 1467-1472, 1970.
B.K.P. Horn, "Shape from shading: a method for obtaining the shape of a smooth opaque object from one view," *Technical Report 232*, Project MAC, Massachusetts Institute of Technology (MIT), 1970.
Y. Shirai and M. Suva, "Recognition of polyhedrons with a range finder," *Proceedings of the 2nd International Joint Conference on Artificial Intelligence (IJCAI)*, pp. 80-87, 1971.
P.M. Will and K.S. Pennington, "Grid coding: a preprocessing technique for robot and machine vision," *Proceedings of the 2nd International Joint Conference on Artificial Intelligence (IJCAI)*, pp. 66-70, 1971.
R.W. Gerchberg and W.O. Saxton, "A practical algorithm for the determination of phase from image and diffraction plane pictures," *Optik—International Journal for Light and Electron Optics*, vol. 35, No. 2, pp. 237-246, 1972.
L.H. Quam and M.J. Hannah, "Stanford automatic photogranunetry research," *Technical Report STAN-CS-74-472*, Department of Computer Science, Stanford University, 1974.
N. Balasubramanian, "Comparison of optical contouring methods," *Photogrammetric Engineering and Remote Sensing*, vol. 42, No. 1, pp. 115-120, 1976.
J. Taboada and B.R. Altschuler, "Rectangular grid fringe pattern for topographic applications," *Appl. Opt.*, vol. 15, No. 3, pp. 597-599, 1976.
F.J. MacWilliams and N.J.A. Sloane, "Pseudo-random sequences and arrays," *Proceedings of the IEEE*, vol. 64, No. 12, pp. 1715-1729, 1976.
S. Sakata, "General theory of doubly periodic arrays over an arbitrary finite field and its applications," *IEEE Transactions on Information Theory*, vol. 24, No. 6, pp. 719-730, 1978.
R.J. Woodham, "Photometric method for determining surface orientation from multiple images," *Opt. Eng.*, vol. 19, No. 1, pp. 139-144, 1985.
N.G. de Bruijn, "Sequences of zeros and ones generated by special production rules," Indagationes Mathematicae, *Proceedings of the Koninklijke Nederlandse Akademie van Wetenschappen*, Series A, vol. 84, No. 1, pp. 27-37, 1981.
R.A. Jarvis, "A perspective on range finding techniques for computer vision," *IEEE Transactions on Pattern Analysis and Machine Intelligence* (PAMI), vol. 5, No. 2, pp. 122-139, 1983.

D. Wei and M. Gini, "The use of taper light beam for object recognition", *Robot Vision*, A. Pugh (Ed.), Springer-Verlag, Berlin, pp. 143-153, 1983.
P. Chavel and T.C. Strand, "Range measurement using Talbot diffraction imaging of gratings," *Appl. Opt.* 23, vol. 23, No. 6, pp. 862-871, 1984.
T.C. Strand, "Optical three-dimensional sensing for machine vision," *Opt. Eng.*, vol. 24, No. 1, pp. 33-40, 1985.
F.P. Chiang and D.W. Li, "Random (speckle) patterns for displacement and strain measurement: some recent advances," *Opt. Eng.*, vol. 24, No. 6, pp. 936-943, 1985.
M.Rioux and F. Blais, "Compact three-dimensional camera for robotic applications," *J. Opt. Soc. Am. A* vol. 3, No. 9, pp. 1518-1521, 1986.
K.L. Boyer and A.C. Kak, "Color-encoded structured light for rapid active ranging," *IEEE Transactions on Pattern Analysis and Machine Intelligence (PAMI)*, vol. 9, No. 1, pp. 14-28, 1987.
B. Arbab, "Object identification from parallel light stripes," *Proceedings of the 10th International Joint Conference on Artificial Intelligence (IJCAI)*, vol. 2, pp. 1145-1148, 1987.
R.M. Soneira, "Three-dimensional imaging and scanning range tinders using the parallax principle," *Proceedings of the IEEE International Conference on Robotics and Automation*, vol. 3, pp. 1715-1720, 1988.
P.J. Besl, "Active, optical range imaging sensors," *Machine Vision and Applications*, vol. 1, No. 2, pp. 127-152, 1988.
Y.F. Wang and J.K. Aggarwal, "An overview of geometric modeling using active sensing," *IEEE Control Systems Magazine*, vol. 8, No. 3, pp. 5-13, 1988.
T. Etzion, "Constructions for perfect maps and pseudorandom arrays," *IEEE Transactions on Information Theory*, vol. 34, No. 5, pp. 1308-1316, 1988.
G. Häusler and W. Heckel, "Light sectioning with large depth and high resolution," *Appl. Opt.*, vol. 27, No. 24, pp. 5165-5169, 1988.
D. Poussart and D. Laurendeau, "3-D sensing for industrial computer vision," *Advances in Machine Vision*, pp. 122-159, Springer-Verlag, New York, NY, 1988.
J.K. Aggarwal and C.H. Chien, "3-D structures from 2-D images," *Advances in Machine Vision*, pp. 64-121, Springer-Verlag, New York, NY, 1988.
A. Pentland et al., "A simple, real-time range camera," *Proceedings of the IEEE Computer Society Conference on Computer Vision and Pattern Recognition (CVPR)*, pp. 256-261, 1989.
P. Vuylsteke and A. Oosterlinck, "Range image acquisition with a single binary-encoded light pattern," *IEEE Transactions on Pattern Analysis and Machine Intelligence (PAMI)*, vol. 12, No. 2, pp. 148-164, 1990.
K. Nakazawa, "Development of 3-D robot vision sensor based on active triangulation and astigmatism," *Proceedings of the 16th Annual Conference of IEEE Industrial Electronics Society (IECON)*, vol. 1, pp. 648-652, 1990.
P. Vuylsteke et al., "Image sensors for real-time 3D acquisition: part 1," *Traditional and Non-Traditional Robotic Sensors*, Nato Asi Series, vol. F63, Computer and Systems Sciences, Springer-Verlag New York, NY, pp. 187-210, 1990.
P.M. Griffin et al., "Generation of uniquely encoded light patterns for range data acquisition", *Pattern Recognition*, vol. 25, No. 6, pp. 609-616, 1992.
R. Arimoto et al., "Imaging properties of axicon in a scanning optical system," *Appl. Opt.*, vol. 31, No. 31, pp. 6653-6657, 1992.
R. Jarvis, "Range sensing for computer vision," *Three-Dimensional Object Recognition Systems, Advances in Image Communications*, pp. 17-56, Elsevier, 1993.
M. Friedmann et al, "Surface analysis using multiple coherent beams," *Nineteenth Convention of Electrical and Electronics Engineers in Israel*, pp. 537-540, 1996.
P. Saari and K. Reivelt, "Evidence of x-shaped propagation-invariant localized light waves," *Phys. Rev. Lett.*, vol. 79, No. 21, pp. 4135-4138, 1997.
C.J. Davies and M.S. Nixon, "A Hough transform for detecting the location and orientation of three-dimensional surfaces via color encoded spots," *IEEE Transactions on Systems, Man and Cybernetics, Part B: Cybernetics*, vol. 28, No. 1, pp. 90-95, 1998.

(56) References Cited

OTHER PUBLICATIONS

R. A. Morano et al., "Structured light using pseudorandom codes," *IEEE Transactions on Pattern Analysis and Machine Intelligence (PAMI)*, vol. 20, No. 3, pp. 322-327, 1998.

J. Batlle et al., "Recent progress in coded structured light as a technique to solve the correspondence problem: a survey," *Pattern Recognition*, vol. 31, No. 7, pp. 963-982, 1998.

Y. Takaki and J. Hojo, "Computer-generated holograms to produce high-density intensity patterns," *Appl. Opt.*, vol. 38, No. 11, pp. 2189-2195, 1999.

R. Lange et al., "Time-of-flight range imaging with a custom solid state image sensor," *Proc. SPIE*, vol. 3823, pp. 180-191, 1999.

U. Levy et al., "Iterative algorithm for determining optimal beam profiles in a three-dimensional space," *Appl. Opt.*, vol. 38, No. 32, pp. 6732-6736, 1999.

F. Chen, G. Brown and M. Song, "Overview of three-dimensional shape measurement using optical methods," *Opt. Eng.*, vol. 39, No. 1, pp. 10-22, 2000.

J. Gühring, "Dense 3-D surface acquisition by structured light using off-the-shelf components", *Proc. SPIE*, vol. 4309, pp. 220-231, 2000.

Y. Li et al., "Computer-generated holograms of three-dimensional realistic objects recorded without wave interference," *Appl. Opt.*, vol. 40, No. 17, pp. 2864-2870, 2001.

U. Levy et al., "On-axis computer-generated holograms based on centrosymmetric partitioning of the pixel," *Appl. Opt.*, vol. 40, No. 32, pp. 5928-5937, 2001.

R. Piestun, "Multidimensional synthesis of light fields," *Optics & Photonics News*, vol. 12, No. 11, pp. 28-32, 2001.

R. Piestun and J. Shamir, "Synthesis of three-dimensional light fields and applications," *Proceedings of the IEEE*, vol. 90, No. 2, pp. 222-244, 2002.

D. Scharstein and R. Szeliski, "A taxonomy and evaluation of dense two-frame stereo correspondence algorithms," *International Journal of Computer Vision (IJCV)*, vol. 47(1-3), pp. 7-42, 2002.

L. Zhang et al., "Rapid shape acquisition using color structured light and multi-pass dynamic programming," *Proceedings of the 1st International Symposium on 3D Data Processing Visualization and Transmission (3DPVT)*, pp. 1-13, 2002.

S.K. Mada et al., "An overview of passive and active vision techniques for hand-held 3D data acquisition," *Proc. Of SPIE*, vol. 4877, pp. 16-27, 2003.

Z. Bouchal, "Nondiffracting optical beams: physical properties, experiments, and applications," *Czech. J. Phys.*, vol. 53, No. 7, pp. 537-578, 2003.

G. Shabtay, "Three-dimensional beam forming and Ewald's surfaces," *Optics Communications*, vol. 226(1-6), pp. 33-37, 2003.

F. Blais, "Review of 20 years of range sensor development," *J. Electron. Imaging* vol. 13, No. 1, pp. 231-243, 2004.

J. Salvi et al., "Pattern codification strategies in structured light systems," *Pattern Recognition*, vol. 37, No. 4, pp. 827-849, 2004.

D. Sazbon et al., "Qualitative real-time range extraction for preplanned scene partitioning using laser beam coding," *Pattern Recognition Letters*, vol. 26, No. 11, pp. 1772-1781, 2005.

A.S. Desyatnikov et al., "Azimuthons: Spatially modulated vortex solitons," *Phys. Rev. Lett.* 95, 203904, 2005.

M. Zamboni-Rached et al., "Theory of 'frozen waves': modeling the shape of stationary wave fields," *J. Opt. Soc. Am. A*, vol. 22, No. 11, pp. 2465-2475, 2005.

V. Arrizón et al., "Pixelated phase computer holograms for the accurate encoding of scalar complex fields," *J. Opt. Soc. Am. A.*, vol. 24, No. 11, pp. 3500-3507, 2007.

S. Lopez-Aguayo and J.C. Gutiérrez-Vega, "Elliptically modulated self-trapped singular beams in nonlocal nonlinear media: ellipticons," *Opt. Express*, vol. 15, No. 26, pp. 18326-18338, 2007.

J. García et al.,"Three-dimensional mapping and range measurement by means of projected speckle patterns," *Appl. Opt.*, vol. 47, No. 16, pp. 3032-3040, 2008.

J. Salvi, S. Fernandez, T. Pribanic and X. Llado, "A state of the art in structured light patterns for surface profilometry," *Pattern Recognition*, vol. 43, pp. 2666-2680, 2010.

H. Duadi et al., "Correlation based interpolation technique for accurate 3-D estimation via projection of axially varied patterns," *3D Research*, vol. 2, No. 4, pp. 1-6, 2011.

"Correspondence Problem," Wikipedia; http://en.Wikipedia.org/wiki/correspondence_problem.

\* cited by examiner

METHOD AND SYSTEM FOR PROVIDING THREE-DIMENSIONAL AND RANGE INTER-PLANAR ESTIMATION

This is a National Phase of International Application No. PCT/IL2009/000965 filed Oct. 11, 2009, which claims the benefit of U.S. Provisional Application No. 61/136,804 filed Oct. 6, 2008.

FIELD OF THE INVENTION

The present invention relates to 3-D (three-dimensional) and range estimation. More particularly, the present invention relates to an SOP (Single Optical Path) three-dimensional and range imaging method, apparatus and system thereof, which eliminates the conventional requirement for a Stereo-Baseline, and thus allows providing optical elements within a relatively small package, regardless of the measurement distance.

DEFINITIONS, ACRONYMS AND ABBREVIATIONS

Throughout this specification, the following definitions are employed:

Axially Varying Intensity: the intensity that varies along one or more axes.

Stereopsis: is the process in visual perception leading to the sensation of depth from the two slightly different projections onto the retinas of the two eyes. The differences in the two retinal images are usually called horizontal disparity, retinal disparity, or binocular disparity. The differences arise from the eyes different positions in the head. Stereopsis is commonly referred to as depth perception (from stereo meaning solidity, and opsis meaning vision or sight).

Coded (Structured) Light: is the light projected on a scene by using a predefined pattern of pixels. When the pattern strikes one or more objects within the scene, it deforms and, in turn, allows a vision system to calculate the depth and surface information of the objects, by using, for example, structured-light 3-D scanners.

BACKGROUND OF THE INVENTION

The majority of commercial range-imaging systems are generally related to two main groups: a) triangulation systems; and b) TOF (Time of Flight) systems. Other less common prior art systems and methods thereof include a Shape-from-Shading technique (as presented in the article "Shape from shading: a method for obtaining the shape of a smooth opaque object from one view" by B. K. P Horn, Technical Report 79, Project MAC, Massachusetts Institute of Technology (MIT), 1970), a Shape-from-Defocus technique (as presented in the article "A simple, real-time range camera" by A. Pentland et. al, Proceedings of IEEE Computer Society Conference on Computer Vision and Pattern Recognition (CVPR), 1989), a Photometric-stereo technique (as presented in the article "Photometric method for determining surface orientation from multiple images" by R. J. Woodham, Optical Engineering, Volume 19, No. 1, Pages 139-144, January-February 1980), a Moire-Interferometry technique (as presented in the article "Moire topography" by H. Takasaki, Applied Optics, Volume 9, Issue 6, Pages 1467-1472, 1970), and others.

According to the prior art, systems from the above triangulation group are essentially based on a fundamental quality of light—its travel in straight lines. This geometrical attribute constitutes the difference between what is seen with the right and left eye, which is what human binocular depth perception (Stereopsis) is based on. In turn, the triangulation group consists of two major sub-groups: Passive-Triangulation and Active-Triangulation.

Inspired by various biological systems, the Passive-Triangulation methods (also known as the Passive Stereo methods) are probably the oldest methods for range imaging, where depth data is extracted through matching correspondences between two or more images taken from different angles. Despite nearly fifty years of research in the field (such as taught by B. Julesz in the article titled "Towards the automation of binocular depth perception (AUTOMAP-1)", Proceedings of IFIPS Congress, Munich, Pages 439-444, 1962), conventional Passive-Triangulation methods suffer from significant inabilities to recapture featureless areas, areas with repeating patterns and structures, and also surface boundaries. Despite these shortcomings, Passive-Triangulation is still appealing for certain tasks aimed at reconstructing highly textured and relatively continuous areas, such as 3-D modeling from high altitude aerial photographs (e.g., as presented in the article by L. H. Quam et. al., "Stanford automatic photogrammetry research", Technical Report STAN-CS-74-472, Department of Computer Science, Stanford University, December 1974).

In contrast to Passive-Triangulation systems, Active-Triangulation systems are known in the art for their high reliability. In these systems, the "notorious" correspondence problem (such as described for example in the following Web page http://en.wikipedia.org/wiki/Correspondence_problem) is completely avoided due to use of an additional dedicated active illumination source, which projects Structured Light over the acquired scene. Structured Light has a designated layout whose purpose is to provide a distinct identification to each local region of it that is back-reflected from the scene and caught by a camera. Since the correspondence takes place according to a predefined format, there is no need for two cameras, and only one camera and one projector can usually be used for performing the required triangulation. Besides being reliable and having a relatively simple design, these Active-Triangulation systems also have relatively high accuracy in depth measurement.

However, unlike Passive-Triangulation systems, the majority of Active-Triangulation systems are usually limited to range imaging of static environments (objects). This is because they actually utilize a temporal Structured Light format, meaning the use of a synchronized sequence of projections and image captures, starting with the "classic" Light-Stripe (such as presented by Y. Shirai et. al. in the article titled "Recognition of polyhedrons with a range finder", 2nd International Joint Conference on Artificial Intelligence (IJCAI), Pages 80-87, London, 1971) that scans the imaged environment in a controlled angular motion, and ending, for example, with more advanced systems which utilize a video projector to rapidly exchange various Coded-Light patterns (such as disclosed in U.S. Pat. No. 4,175,862). In addition, it should be noted that in conventional Active-Triangulation systems the acquired scene also must remain static until the scanning process or pattern switching is accomplished.

On the other hand, if only a single Coded-Light pattern is used, it is possible to acquire the scene in motion as well. This concept has been a subject to research since the early days of the Active-Triangulation approach (such as presented by P. M. Will et. al. in the article titled "Grid coding: A preprocessing technique for robot and machine vision", Computers and Artificial Intelligence, pages 66-70, 1971). The main challenge in developing such types of codification methods usually involves embedding sufficiently large identification code words within small local regions of a single pattern (as presented in the article titled "Pattern codification strategies in structured light systems" by J. Salvi, Pattern Recognition, Volume 37, Issue 4, Pages 827-849, April 2004). Most of the prior art approaches include the encoding of colored stripes (such as presented by K. L. Boyer et. al. in the article titled "Color-encoded structured light for rapid active ranging", IEEE Transactions on Pattern Analysis and Machine Intelligence (PAMI), Volume 9, Issue 1, Pages 14-28, January 1987) or colored spots (as presented by R. A. Morano in the article titled "Structured light using pseudorandom codes", IEEE Transactions on Pattern Analysis and Machine Intelligence (PAMI), Volume 20, Issue 3, Pages 322-327, March 1998). These approaches are mainly suitable for capturing neutral colored objects under relatively low ambient light conditions. Other prior art approaches suggest using various shapes and spatial features as an alternative to the color (as presented by P. Vuylsteke et. al. in the article titled "Range image acquisition with a single binary-encoded light pattern", IEEE Transactions on Pattern Analysis and Machine Intelligence (PAMI), Volume 12, Issue 2, Pages 148-163, 1990).

According to the prior art, Active-Triangulation systems require setting a camera and projector apart by a predefined distance, known as the Stereo-Baseline. Usually, the magnitude of the baseline is set to approximately 10% to 50% of the distance to the targeted scene. In general, a shorter baseline may result in low accuracy levels, while a larger baseline may result in difficulties to capture surfaces that are not facing the system. This camera/projector separation requirement is usually the cause of most of the apparent shortcomings of the conventional Active-Triangulation systems, which generally are:

- the known "stereo occlusion problem": a surface may be reconstructed only if it maintains a clear line of sight with both the camera and projector. This condition cannot be met when dealing, for example, with deep concavities.
- applicability to short ranges only: since the baseline is set proportionally to the measurement distance, long ranges require impractical baseline lengths. For example, to measure objects a hundred meters away at high precision would require a baseline length of at least ten meters. Since the triangulation requires the camera and projector to maintain their relative position in a relatively precise manner, this would usually require a bulky and sturdy design and, possibly, also a controlled environment, isolated from both vibrations and temperature changes.

The common choice for long-distance range-imaging is the TOF (Time-of-Flight) technology. Unlike Active-Triangulation systems, conventional TOF systems are based on another fundamental quality of light—its travel at a constant speed. Systems from the above-mentioned TOF group actually serve as Optical-Radars, measuring the time it takes for rapid light pulses to return from the targeted scene, using a fast timing circuitry. Most of the TOF systems operate by scanning point by point, and are therefore only suitable for static scenes. Such 3-D scanners are the terrestrial LIDAR (Light Detection and Ranging) systems. However, some TOF systems, such as the conventional Flash-LIDAR systems (presented for example, by R. Lange et. al. in the article titled "Time-of-flight range imaging with a custom solid-state image sensor", Laser Metrology and Inspection, Proceedings of the SPIE, Volume 3823, Pages 180-191, Munich, September 1999), have the capability to simultaneously acquire a multiplicity of points, making them also suitable for motion range-imaging. Further, TOF technology differs from Active-Triangulation approach by another important feature: it does not require a baseline. Thus, by using conventional prisms, it is possible to set both the camera and the pulsed light emitter in an SOP (Single-Optical-Path) configuration. Since both imaging and light emission are carried over the same optical path, no "stereo occlusions" occur and the system can operate at large distances regardless of physical size. In practice, a "nearly" SOP configuration, where the camera and the light emitter are set close to each other, is often implemented, since it simplifies the system while introducing, at the most, only negligible "stereo occlusions".

However, while TOF technology provides a solution for both range-imaging of distant scenes as well as concave surfaces, TOF systems are usually more complicated, and thus more costly than Active-Triangulation systems. Furthermore, state of the art motion-capable range-imaging TOF technologies are usually considered inferior to Active-Triangulation systems, both in terms of range measurement accuracies as well as in terms of lateral resolution.

Another prior art SOP (Single Optical Path) range-imaging method, which also does not require a Stereo-Baseline, is introduced by D. Sazbon et. al. in the article titled "Qualitative real-time range extraction for preplanned scene partitioning using laser beam coding", Pattern Recognition Letters, Volume 26, Issue 11, Pages 1772-1781, August 2005. This method is based on the projection of a multiplicity of axially varied illumination patterns generated by a beam-shaping optical element. In the original experimental design, each pattern consisted of an array of slits oriented at a specific angle. Thus, the distance to a certain surface was indicated by the orientation of the reflected slits, captured by a camera coupled to a projector. Similarly to conventional TOF systems, this system can be set in an SOP configuration, where both the projector and the acquisition camera share (or nearly share) the same optical axis, and where the range measurement accuracy does not depend on their distance. Yet unlike TOF systems, it benefits from a simple design, since it requires no moving parts (e.g., no scanning mirrors), no fast timing circuitry, and no significantly sensitive high form-factor pixel architecture (thus, allowing the use of common low-cost high resolution camera sensors). Also, similarly to Single-Pattern Active-Triangulation methods, this range-imaging method allows motion range-imaging of dynamic scenes, since it requires only a single camera snapshot to acquire a complete range-image. However, in the above range-imaging method proposed by D. Sazbon et al., the measurement accuracy, as well as the acquisition range, depends upon the number of discrete patterns that the element can generate. The design of the element may be performed by using a conventional iterative numerical approach (such as presented by U. Levy et. al. in the article titled "Iterative algorithm for determining optimal beam profiles in a three-dimensional space", Applied Optics, Volume 38, Issue 32, Pages 6732-6736, 1999, which is further based on the article of R. W. Gerchberg et. al. titled "A practical algorithm for the determination of phase from image and diffraction plane pictures", Optics, Volume 35, Pages 237-246. 1972). According to the iterative numerical approach, a set of desired light intensity distributions (i.e., patterns) are imposed for a number of discrete planes positioned at varied axial ranges. However, there is a non-linear transition between the intensity images created at different planes (limiting measurement accuracy for the 3-D and range estimation), which also means that the measured workspace is partitioned by a set of sparse discrete range segments. This characteristic is not problematic in applications, such as robotic navigation and obstacle detection, where spatiotemporally sparse range measurements may suffice. For example, it should be sufficient that the robot would be able to distinguish between a set of predefined ranges. However, in applications such as 3D modeling for content creation, product quality control in manufacturing, medical imaging and others, much higher measurement densities are usually required.

Thus, there is a continuous need in the art to provide a relatively accurate SOP three-dimensional and range imaging method and system thereof, which eliminates the traditional requirement for a Stereo-Baseline, and allows containing optical elements within a relatively small package, regardless of the measurement distance, while substantially avoiding the known "stereo occlusion problem".

Also, there is a continuous need in the art to provide a method and system for 3-D object profile and range inter-planar estimation, such a system having relatively simple and sturdy design and containing relatively few elements with no moving parts, and also substantially eliminating the need for user calibration.

In addition, there is a need in the art to provide a method and system for 3-D and range estimation enabling using imaging device sensors that are relatively inexpensive, have relatively low sensitivity and relatively high resolution.

SUMMARY OF THE INVENTION

The present invention relates to an SOP three-dimensional and range imaging method, apparatus and system thereof, which eliminates the conventional requirement for a Stereo-Baseline, and thus allows providing optical elements within a relatively small package, regardless of the measurement distance.

A method of performing 3-D (three-dimensional) object profile inter-planar estimation and/or range inter-planar estimation of one or more objects within a scene, said method comprising:
  a) providing a predefined finite set of distinct types of features, giving rise to feature types, each feature type being distinguishable according to a unique bi-dimensional formation;
  b) providing a coded light pattern comprising multiple appearances of said feature types;
  c) projecting said coded light pattern, having axially varying intensity, on one or more objects within a scene, said scene having at least two planes, giving rise to a first plane and to a second plane;
  d) capturing a 2-D (two-dimensional) image of said objects having said projected coded light pattern projected thereupon, thereby giving rise to a captured 2-D image, said captured 2-D image comprising reflected said feature types;
  e) determining intensity values of the 2-D captured image, giving rise to the determined intensity values; and
  f) performing 3-D object profile inter-planar estimation and/or range inter-planar estimation of said one or more objects within said scene based on said determined intensity values.

According to an embodiment of the present invention, the method further comprises performing predefined computational operations based on the determined intensity values.

According to another embodiment of the present invention, wherein the performing the predefined computational operations comprises correlating the intensity values to at least one predefined lookup table.

According to still another embodiment of the present invention, the method further comprises determining two highest correlation values $MAX_1$ and $MAX_2$, said two highest correlation values being corresponding to the first and second planes of the scene, respectively.

According to still another embodiment of the present invention, the method further comprises determining additional two highest correlation values $MIN_1$ and $MIN_2$, besides the determined $MAX_1$ and $MAX_2$ values, said two highest correlation values corresponding to the first and second planes of the scene, respectively.

According to still another embodiment of the present invention, wherein the performing predefined computational operations comprises calculating a peak ratio of the first and second planes of the scene.

According to still another embodiment of the present invention, the method further comprises calculating the peak ratio of the first and second planes of the scene by dividing the highest correlation value $MAX_1$ on the highest correlation value $MAX_2$.

According to a further embodiment of the present invention, wherein the performing predefined computational operations comprises calculating a Signal-to-Noise ratio $SNR_1$ at the first plane of the scene.

According to still a further embodiment of the present invention, the method further comprises calculating the Signal-to-Noise ratio $SNR_1$ at the first plane of the scene by dividing the highest correlation value $MAX_1$ on the $MIN_1$ value.

According to still a further embodiment of the present invention, wherein the performing predefined computational operations comprises calculating a Signal-to-Noise ratio $SNR_2$ at the second plane of the scene.

According to still a further embodiment of the present invention, the method further comprises calculating the Signal-to-Noise ratio $SNR_2$ at the second plane of the scene by dividing the highest correlation value $MAX_2$ on the $MIN_1$ value.

According to still a further embodiment of the present invention, the method further comprises determining a 3-D geometric shape of the one or more objects within the scene based on the predefined computational operations.

According to still a further embodiment of the present invention, the method further comprises providing the coded light pattern as one or more of the following:
  a) a periodic pattern; and
  b) a non-periodic pattern.

An apparatus is configured to perform 3-D (three-dimensional) object profile inter-planar estimation and/or range inter-planar estimation of one or more objects within a scene, said apparatus comprising:
  a) a predefined set of types of features, giving rise to feature types, each feature type being distinguishable according to a unique bi-dimensional formation;
  b) a coded light pattern, having axially varying intensity, comprising multiple appearances of said feature types;
  c) a projector configured to project said coded light pattern on one or more objects within a scene, said scene having at least two planes, giving rise to a first plane and to a second plane;
  d) an imaging device configured to capture a 2-D (two-dimensional) image of said objects having said projected coded light pattern projected thereupon, giving rise to a 2-D captured image, said 2D image comprising reflected said feature types; and
  e) a processing unit configured to:
    e.1. determine intensity values of the 2-D captured image, giving rise to the determined intensity values; and e.2. perform 3-D object profile inter-planar estimation and/or range inter-planar estimation of said one or more objects within said scene by using the determined intensity values.

According to an embodiment of the present invention, the apparatus further comprises a diffractive optical element designed to enable projecting said coded light pattern toward said one or more objects.

According to another embodiment of the present invention, the diffractive optical element is a beam splitter.

According to still another embodiment of the present invention, the projector further comprises a phase mask configured to enable obtaining corresponding intensity values on the 2-D image to be captured.

According to still another embodiment of the present invention, wherein the phase mask is a beam shaping diffractive optical element.

According to a further embodiment of the present invention, the processing unit is further configured to perform predefined computational operations based on the determined intensity values.

According to still a further embodiment of the present invention, the processing unit is provided within the imaging device.

A system is configured to perform 3-D (three-dimensional) object profile inter-planar estimation and/or range inter-planar estimation of one or more objects within a scene, said system comprising:

a) a pattern-projecting apparatus configured to project a bi-dimensional coded light pattern, having axially varying intensity and having a plurality of feature types onto one or more objects within a scene having at least two planes, such that each feature reflects from a respective reflection location of the object within said scene, giving rise to a reflected feature, said feature types being distinguishable according to a unique bi-dimensional formation;

b) an imaging device configured to capture a 2-D (two-dimensional) image of said scene comprising the reflected features; and c) a processing unit configured to:
  c.1. determine intensity values of the 2-D captured image, giving rise to the determined intensity values; and
  c.2. perform 3-D object profile inter-planar estimation and/or range inter-planar estimation of said one or more objects within said scene by making use of the determined intensity values.

According to an embodiment of the present invention, the pattern-projecting apparatus further comprises a projector configured to project the coded light pattern on the one or more objects within the scene.

A method of generating a sequence of SOP (Single-Optical-Path) or nearly SOP patterns, said method comprising modulating a predefined pattern and using at least one of volumetric matrices, each of said volumetric matrices complying with one or more predefined rules.

According to an embodiment of the present invention, the method further comprises manipulating the sequence of patterns by using image processing.

According to an embodiment of the present invention, the method further comprises providing the volumetric matrices as one or more of the following:
a) a repeating matrices; and
b) a non-repeating matrices.

A method of generating a sequence of SOP (Single-Optical-Path) or nearly SOP patterns, said method comprising:

a) defining code formations and corresponding code formation changes;
b) generating one or more sets of local-uniqueness matrices, containing only said code formations;
c) generating at least one set of matrices containing only said local-uniqueness matrices;
d) generating at least one set of consecutive matrices, containing only sequences of said matrices, according to said code formation changes, while said at least one set of the consecutive matrices does not contain any axial repetitions of both local-uniqueness matrices and averaged local-uniqueness matrices;
e) generating at least one set of volumetric matrices, while said volumetric matrices containing only said consecutive matrices and not containing any axial repetitions of both local-uniqueness matrices and averaged local-uniqueness matrices; and
f) generating a sequence of patterns by modulating a predefined pattern and using at least one of said volumetric matrices.

According to an embodiment of the present invention, the method further comprises providing the matrices with symmetries other than translational.

According to another embodiment of the present invention, the method further comprises generating, for obtaining the sequence of nearly SOP patterns, the at least one set of the matrices that comprises repetitions of the local-uniqueness matrices in a predefined direction or do not comprise said repetitions.

According to still another embodiment of the present invention, the method further comprises generating, for obtaining the sequence of nearly SOP patterns, the at least one set of the consecutive matrices that comprises repetitions of the both local-uniqueness matrices and averaged local-uniqueness matrices in a predefined direction or do not comprise said repetitions.

According to a further embodiment of the present invention, the method further comprises generating, for obtaining the sequence of nearly SOP patterns, the at least one set of volumetric matrices that comprises repetitions of the both local-uniqueness matrices and averaged local-uniqueness matrices in a predefined direction or do not comprise said repetitions.

BRIEF DESCRIPTION OF THE DRAWINGS

In order to understand the invention and to see how it may be carried out in practice, various embodiments will now be described, by way of non-limiting examples only, with reference to the accompanying drawings, in which.

Figure 1:
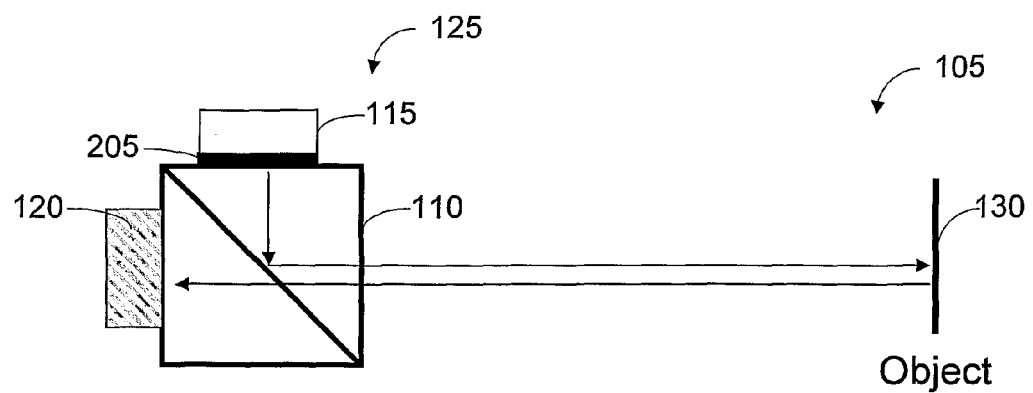
FIG. 1 is a schematic illustration of a 3-D object profile and range estimation system, according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE EMBODIMENTS

Unless specifically stated otherwise, as apparent from the following discussions, it is appreciated that throughout the specification discussions utilizing terms such as "processing", "computing", "calculating", "determining", or the like, refer to the action and/or processes of a computer that manipulate and/or transform data into other data, said data represented as physical, e.g. such as electronic, quantities. The term "computer" should be expansively construed to cover any kind of electronic device with data processing capabilities, including, by way of non-limiting example, personal computers, servers, computing systems, communication devices, processors (e.g. digital signal processor (DSP), microcontrollers, field programmable gate array (FPGA), application specific integrated circuit (ASIC), etc.) and other electronic computing devices. Also, operations in accordance with the teachings herein may be performed by a computer specially constructed for the desired purposes or by a general purpose computer specially configured for the desired purpose by a computer program stored in a computer readable storage medium.

Figure 3A:
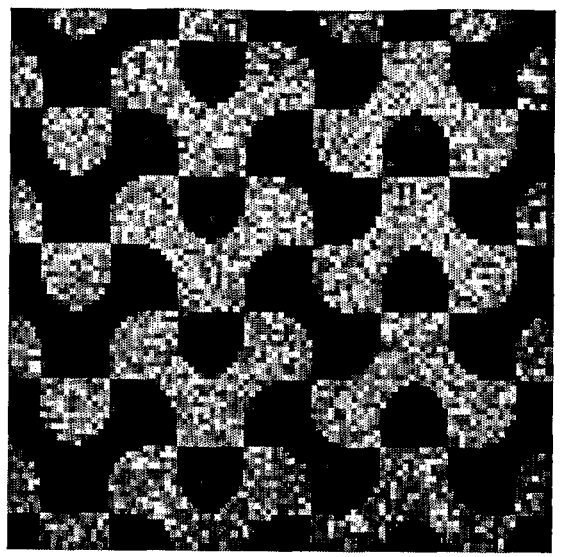
FIGS. 3A and 3B are sample light intensity distribution images at the first and second planes of a scene, respectively, according to an embodiment of the present invention.
Figure 3B:
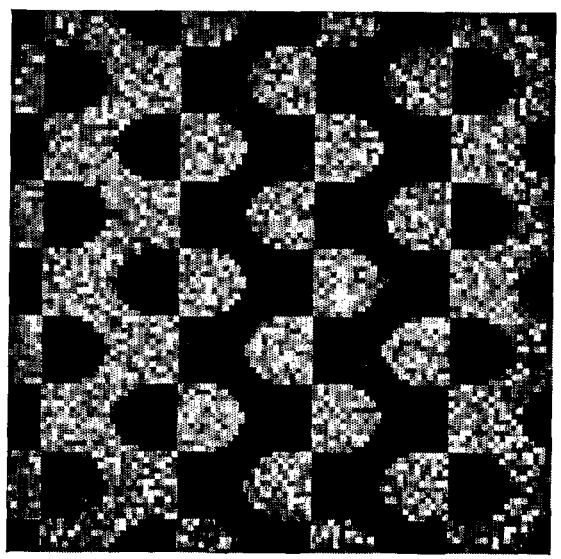

FIG. 1 is a schematic illustration of the 3-D object profile and range inter-planar estimation system/apparatus 105, according to an embodiment of the present invention. System 105 comprises a pattern-projecting module (apparatus) 125, which in turn comprises: a projector 115 for projecting structured (coded) light, having axially varying intensity, that corresponds to a predefined bi-dimensional pattern of pixels, giving rise to a structured light pattern that contains a predefined array of a finite set of identifiable feature types in the form of spatial formations of varying intensity light beams; an optical element, such as a beam splitter 110, for enabling projecting said structured light toward object 130 (such as a 3-D object); and an imaging device (such as camera 120, which can be for example, a CCD (Charged Coupled Device) or CMOS (Complementary Metal Oxide Semiconductor) digital video camera, or any other array of photo-detector elements) for capturing (two-dimensional) images comprising patterns reflected from said 3-D object 130. It should be noted that projector 115 further comprises a predetermined phase mask 205, being a beam shaping diffractive optical element, and attached, for example, to a projector 115 laser (not shown) for enabling obtaining corresponding intensity distributions (as shown in FIGS. 3A and 3B), according to said predefined bi-dimensional pattern.

In addition, it should be noted that according to an embodiment of the present invention, both system 105 and object 130 are aligned around the same optical axis. According to this embodiment of the present invention, the combination of both optical paths (toward object 130 and back to camera 120) is obtained by wasting approximately 75% of the energy (approximately 50% of the projected light reaches object 130, and in turn, approximately 50% of the reflected light reaches camera 120).

According to an embodiment of the present invention, system 105 enables determining 3-D (three-dimensional) estimation as well as range estimation by an on-axis projection of axially varied or non-varied patterns. Projector 115 is aligned on an axis with a camera 120 that images the reflection obtained from 3-D object 130 and estimates the 3-D topography and range to said object 130 by comparing the reflected patterns, comprising a reflected finite set of corresponding identifiable feature types, with the predefined axially varied distribution.

According to another embodiment of the present invention, the axially varied patterns are realized by designing beam-shaping diffractive optical element 205 capable of shaping different intensity distributions along with a finite number of axial planes, which are inserted as constraints in the numerically iterative design of said optical element 205. For example, this shaping is feasible by coding the required axially changing amplitude information in a relatively highly variable and non-constrained generated phase distribution.

According to still another embodiment of the present invention, the number of planes, in which the desired beam-shaping distribution to be obtained, is limited. Thus, in order to obtain the desired accuracy of the 3-D estimation and/or range estimation, while said accuracy not being equal to the axial separation between two adjacent planes, a predefined evaluation for the distributions between the planes is performed. This can be done, for example, by making a proper design of the change between various patterns of different planes. As a result, according to an embodiment of the present invention, a correlation-based computation leads to obtaining a relatively accurate indication regarding the inter-planar position of object 130 that reflects the structured light pattern, containing a predefined array of a finite set of identifiable feature types.

It should be noted that by using a conventional Gerchberg-Saxton (GS) iterative algorithm (as presented by U. Levy at. al. in the article, titled "Iterative algorithm for determining optimal beam profiles in a 3-D space," Applied Optics, volume 38, pages 6732-6736, 1999), it is possible to plan an optical beam-shaping element 205 for generating different amplitude distributions in different axial positions (planes). In turn, it can be used for realizing a 3-D optical system, whose 3-D accuracy does not depend on the distance between projector 115 and imaging device 120. As a result, the reflected pattern projected by said projector 115 and captured (imaged) by means of said imaging device 120 designates the distance to object 130. It should be noted that the designed beam-shaping diffractive optical element (such as phase mask 205) can only obtain a limited number of distribution planes. Thus, according to an embodiment of the present invention, an inter-planar interpolation method (as presented in FIG. 6) is used to improve the accuracy of the estimation between these planes, enabling relatively precisely estimate of the inter-planar distance of object 130. The range between two adjacent planes (such as Plane 2 and Plane 3 (FIG. 2)) is interpolated by evaluating the correlation with each of the two different planes. The correlation (CORR), in general, can be defined as:

$$\text{CORR} = \Im^{-1}\{(\Im(A)^*) \cdot (\Im(B))\} \quad (1)$$

where A and B are the variables that are correlated together, $\Im(\ )$ is a Fourier transform operator and $\Im^{-1}(\ )$ is an inverse Fourier transform operator. As a result, if A and B are similar, a peak in the correlation will be obtained.

It can be supposed according to an embodiment of the present invention that two planes have, for example, similar patterns, and therefore, said patterns are only shifted in their position (in said planes). The correlation is always shift invariant, meaning that a shift of the input in relation to the reference only shifts the position of the correlation peak. Hence, in this case, there are two possible positions for the peak, while the shift between the peaks corresponds to the relative shift of the projected pattern in the two planes. According to this embodiment of the present invention, in the range between these closest planes (while said similar patterns only vary in their position), the energy is transferred from one correlation peak to another. Then, by quantifying the above energy transfer, the relatively accurate inter-planes position (location) of 3-D object 130, reflecting one or more identifiable feature types of the projected pattern, can be estimated.

For another example, according to another embodiment of the present invention, it is supposed that a 192×192 pixel phase mask 205 is planned with a pixel size of 10 microns for an 808 nanometer laser located within projector 115. Also, it is supposed that the first desired intensity plane (e.g., Plane 1 (FIG. 2)) is positioned at the distance of 0.1 meter from said phase mask and the second intensity plane (e.g., Plane 2 (FIG. 2)) is positioned at the distance of 0.6 meter. The resulting two obtained intensity images are illustrated in FIGS. 3A and 3B. In order to estimate the range (object position) at any location between the above planes, the following correlation equation is used (where m an index of a plane that is equal, for example, to one or two—Plane 1 or Plane 2, respectively), which is similar to equation (1) above:

$$\text{CORR}^m = \Im^{-1}\{\Im[I(Z)] \cdot \Im^*[I^m{}_{REF}]\} \quad (2)$$

where $I^m{}_{REF}$ is the desired output after plane in (e.g., Plane 1), and I(Z) is the intensity in any axial inter-planar range (position) Z.

Figure 4A:
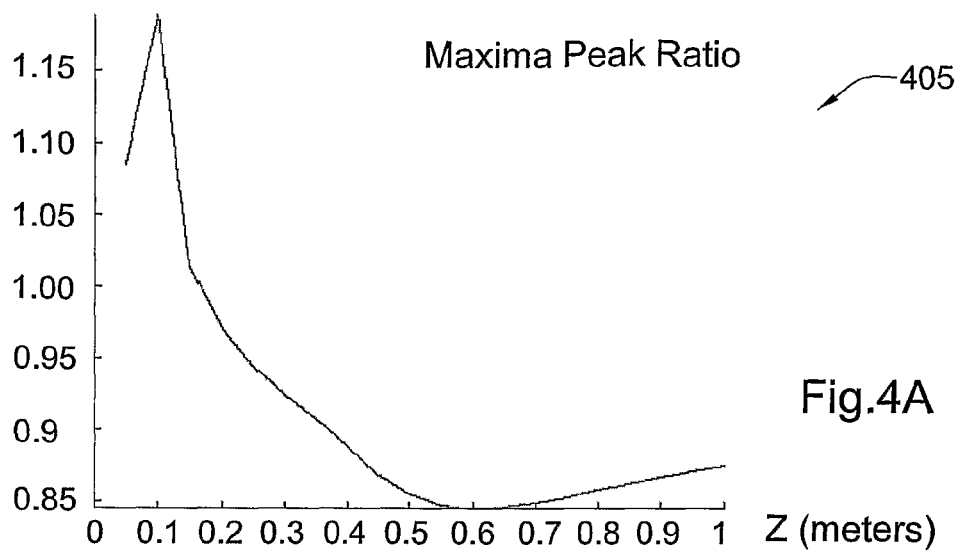
FIGS. 4A to 4C are schematic graphs of interpolation parameters to be calculated and to be further used for making a decision regarding the object axial position, according to an embodiment of the present invention.
Figure 4B:
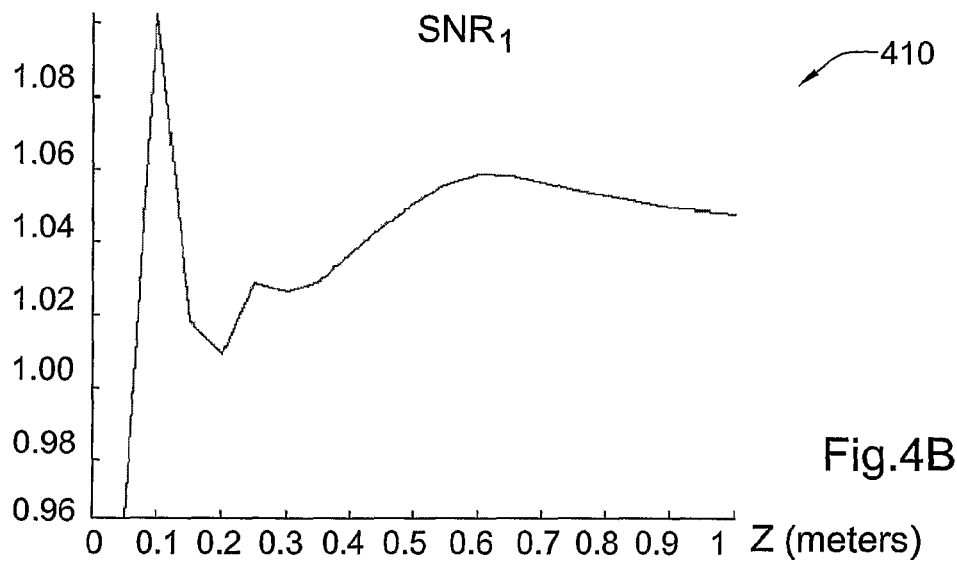
Figure 4C:
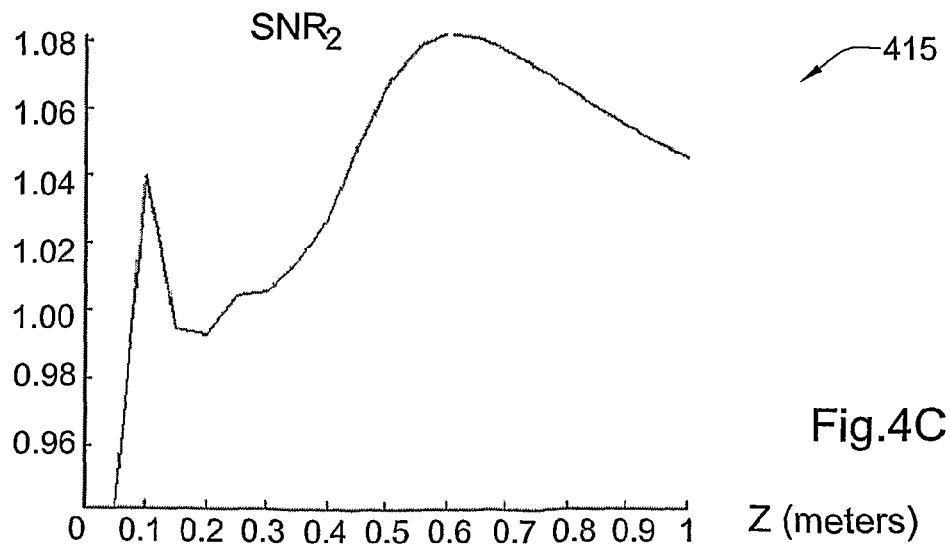

According to an embodiment of the present invention, in order to evaluate the range of object 130 or other objects within the scene, the following three parameters are considered: the maxima peak ratio that is a ratio of two highest correlation values (the correlation in the position of the peak) in each of two planes (such as Plane 1 and Plane 2 (FIG. 2)), respectively; the first Signal-to-Noise ratio (denoted $SNR_1$) in the first plane (such as Plane 1); and the second Signal-to-Noise ratio (denoted $SNR_2$) in the second plane (such as Plane 2), as schematically presented in FIGS. 4A to 4C.

It should be noted that all required processing operations (such as processing captured images, performing corresponding calculation operations, making decisions regarding 3-D object profile estimation and/or range estimation of the one or more objects within an imaged scene, on which coded light patterns are projected) may be performed by means of a processing unit/system (not shown), such as a DSP, microcontroller, FPGA, ASIC, etc., or any other conventional and/or dedicated computing unit/system. Moreover, according to another embodiment of the present invention, the processing unit/system can be provided (integrated) within imaging device 120.

Also, it should be noted that according to an embodiment of the present invention, the processing unit is further configured to determine a 3-D geometric shape of the one or more objects 130 within the scene based on a result(s) of the predefined computational operations.

In addition, it should be noted that according to an embodiment of the present invention, the coded light pattern can be of any dimension, such as 1-D, 2-D, 3-D.

Further, it should be noted that according to another embodiment of the present invention, optical element 110 can be either diffractive or non-diffractive element.

Figure 2:
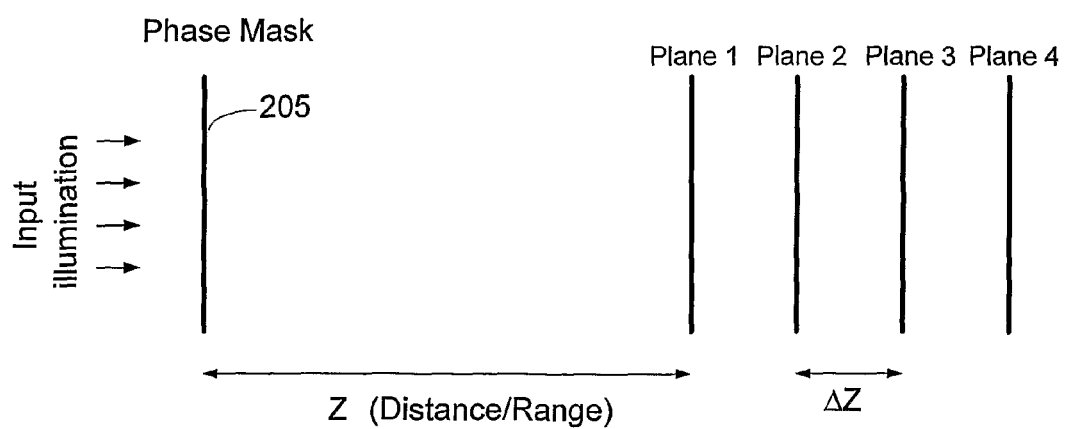
FIG. 2 is a schematic illustration of virtual planes, though which the projected structured (coded) light passes, while progressing toward one or more objects within a scene, according to an embodiment of the present invention.

FIG. 2 is a schematic illustration of virtual planes, such as Planes 1 to 4, though which the projected structured (coded) light passes, while progressing toward object 130 (FIG. 1), according to an embodiment of the present invention. It is supposed, for example, that Z denotes the axial position (range/distance from phase mask 205, provided for example within projector 115 (FIG. 1) to Plane 1). In addition, ΔZ denotes the distance between virtual Plane 1 and Plane 2.

It should be noted that the term "virtual" is used only to emphasize that according to an embodiment of the present invention the above planes are not physical objects within the scene, and thus, this term should not be considered as limiting.

FIGS. 3A and 3B are sample light intensity distribution images 305 and 310 at the first and second planes (Plane 1 and Plane 2 (FIG. 2)) of a scene, respectively, according to an embodiment of the present invention. According to this embodiment, the light intensity distribution images 305 and 310 are correlated to predefined (reference) lookup tables, stored for example within a memory device (not shown), in order to calculate the distance/range to object 130 (FIG. 1) in a relatively accurate manner.

FIGS. 4A to 4C are schematic graphs of parameters to be calculated and to be further used for making a decision regarding the object 130 (FIG. 1) axial inter-planar position (FIG. 2), according to an embodiment of the present invention. FIG. 4A is a schematic graph 405 of the Maxima Peak Ratio (peak ratio) parameter; FIG. 4B is a schematic graph 410 of another parameter representing the first Signal-to-Noise ratio ($SNR_1$) in the first plane (such as Plane 1 (FIG. 2)); and FIG. 4C is a schematic graph 415 of an additional parameter representing the second Signal-to-Noise ratio ($SNR_2$) in the second plane (such as Plane 2 (FIG. 2)). Based on the above three parameters: peak ratio, $SNR_1$ and $SNR_2$, the interpolation is performed, and the decision regarding the axial inter-planar position of object 130 within a scene is made.

Figure 5A:
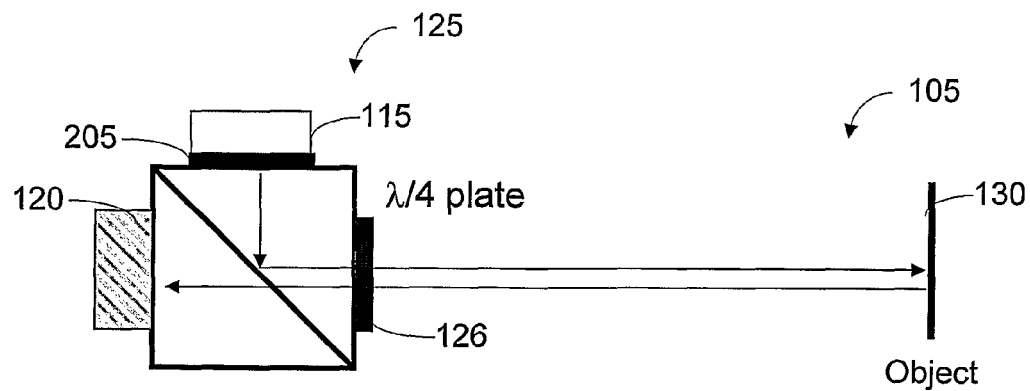
FIG. 5A is a schematic illustration of a 3-D object profile and range estimation system being energetically efficient compared to the system of FIG. 1, according to another embodiment of the present invention.

FIG. 5A is a schematic illustration of 3-D object profile and range inter-planar estimation system/apparatus 105 being energetically efficient compared to system 105 (FIG. 1), according to another embodiment of the present invention. According to this embodiment, patterns projection module 125 further comprises polarized beam splitter 110 for enabling providing a polarized structured light toward object 130; and λ/4 plate 126 for converting a linear light polarization to a circular light polarization and vice-versa, where λ is a light wavelength. Further, projector 115 comprises a linearly polarized laser (not shown) having the polarization being adapted to the polarization splitting ratio of said polarized beam splitter 110.

As a result, according to this embodiment of the present invention, system 105 is a polarization-based energetically efficient system, and substantially all light energy (substantially 100%) is outputted from polarized beam splitter 110. When the structured light, which corresponds to a structured light pattern, having axially varying intensity and containing a predefined array of a finite set of identifiable feature types in the form of spatial formations of varying intensity light beams, is outputted from polarized beam splitter 110, its polarization is rotated by means of λ/4 plate 126, and as a result, the light polarization becomes circular. When the polarized structured light is reflected back from object 130 (said object 130 reflecting one or more identifiable feature types of the projected structured light pattern), it passes again through said λ/4 plate 126 and its polarization becomes linearly polarized, but orthogonal to the original polarization of light projected by projector 115. As a result, the use of said polarized beam splitter 110 instead of regular beam splitter 110 (FIG. 1) avoids approximately 50% loss in energy in each passage of the light trough said beam splitter 110. Thus, the light goes directly through polarized beam splitter 110 to an imaging device (such as camera 120) without being split.

Figure 5B:
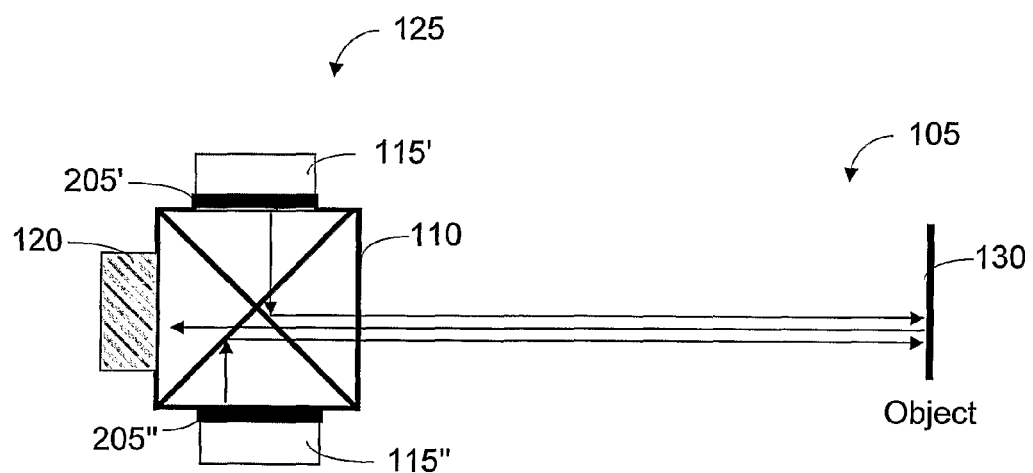
FIG. 5B is another schematic illustration of a 3-D object profile and range estimation system, according to still another embodiment of the present invention.

FIG. 5B is another schematic illustration of 3-D object profile and range inter-planar estimation system/apparatus 105, according to still another embodiment of the present invention. According to this embodiment, system 105 comprises two projectors 115' and 115" operating at two different wavelengths $\lambda_1$ and $\lambda_2$, respectively, since it can be beneficial to project simultaneously several coded light patterns, having axially varying intensities, at different wavelengths by using corresponding phase masks 205' and 205", respectively. It should be noted that by using two different wavelengths, more patterns can be created without expanding the physical size of patterns projection module 125, and in turn, enlarging the amount of information to be passed on.

It should be noted that projecting two different sets of patterns simultaneously, refers to dual projection and imaging (as described in the co-pending patent application WO 2008/062407), which can enhance system 105 in various ways. For example, by simultaneously projecting and imaging pattern sets "A" and "B" (not shown) in different wavelengths, where "B" is the inverse of "A", and by performing subtraction between the corresponding images acquired by means of imaging device 120, a signed pattern is obtained, yielding more robust and more accurate decoding.

Figure 6:
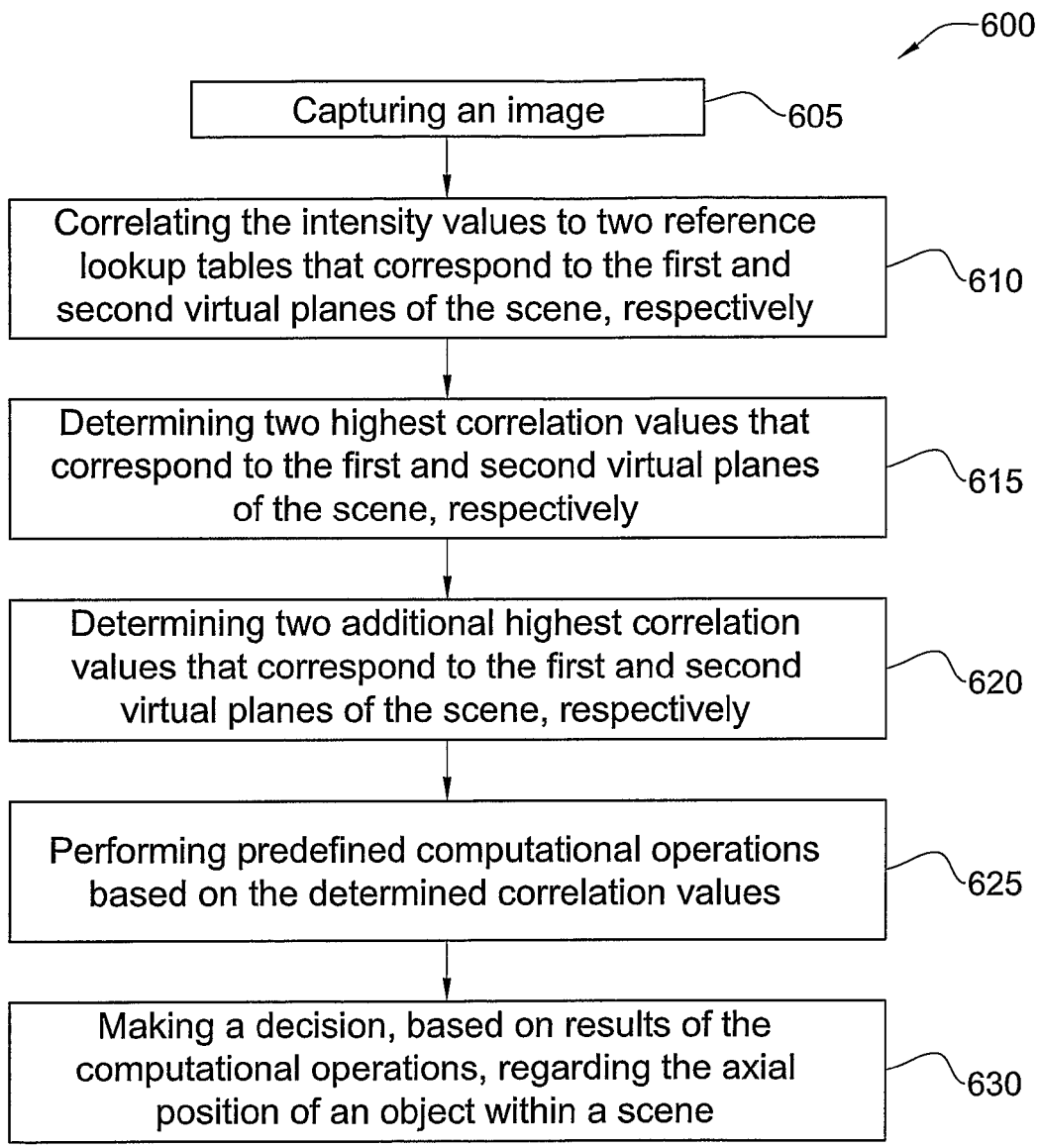
FIG. 6 is a schematic flow chart of performing 3-D object profile and range estimation, according to an embodiment of the present invention.

FIG. 6 is a schematic flow chart 600 of performing 3-D object profile and range estimation, according to an embodiment of the present invention. At step 605, projector 115 (FIG. 1) projects a structured light pattern, which contains a predefined array of a finite set of identifiable feature types in the form of spatial formations of varying intensity light beams, toward object 130 (FIG. 1), and the resulting image (containing one or more reflected identifiable feature types of the projected pattern) is captured by means of imaging device 120 (FIG. 1). Then, at step 610, the intensity values of the captured image are correlated by means of a processing unit/system (not shown) to two corresponding predefined (reference) lookup tables, which correspond to the first and second virtual planes (e.g., Plane 1 and Plane 2 (FIG. 2), respectively), by using for example a correlation equation (2). As a result, at step 610, the two correlations are performed: the first correlation is related to the first virtual plane and the second to the second virtual plane, between which the interpolation is to be performed (leading to a decision regarding the relatively accurate axial inter-planar position of object 130 within the scene). After that, at step 615, the highest value of each of the above two correlations is determined, while each highest correlation value relates to the corresponding plane (Plane 1 or Plane 2, respectively)). As a result, two highest correlation values are determined, and they can be denoted, for example, as "$MAX_1$" and "$MAX_2$". Further, at step 620, an additional highest value of each of the above two correlations (besides the highest values "$MAX_1$" and "$MAX_2$" determined in step 615) is determined. These additional two highest values also relate to the first and second planes (Plane 1 and Plane 2, respectively), and they can be denoted, for example, as "$MIN_1$" and "$MIN_2$". At the next step 625, predefined computational (calculation) operations are performed, such as determining a peak ratio by dividing the value of "$MAX_1$" on "$MAX_2$"

$$\left(\text{peak ratio} = \frac{MAX_1}{MAX_2}\right),$$

and determining $SNR_1$ or $SNR_2$:

$$SNR_1 = \frac{MAX_1}{MIN_1} \text{ or } SNR_2 = \frac{MAX_2}{MIN_2},$$

respectively. Since the phase element (such phase mask 205) is predefined in advance, there is an early knowledge of the values of the parameters (such as the "peak ratio", $SNR_1$ or $SNR_2$ parameters) at all axial positions, including those between the planes. Finally at step 630, according to the early knowledge of the above three parameters peak ratio, $SNR_1$ and $SNR_2$, a decision regarding the relatively accurate axial inter-planar position of object 130 is made. It should be noted that this decision regarding the axial inter-planar position of object 130 within a scene can be made based on a result(s) of other predefined computational operations, being different from the computational operations presented above, which are presented for this example only.

It should be noted that in order to obtain a relatively high 3-D and range estimation accuracy, axial separation between two adjacent planes (e.g., Plane 1 and Plane 2) and the corresponding evaluation for the intensity distributions between the planes can be performed. This can be done, for example, by properly designing the change between the patterns in different (virtual) planes, such that a correlation based computation (performed, for example, by using equation (2)) can provide a relatively accurate indication regarding the precise inter-planar position (range/distance) of reflecting object 130.

Figure 7:
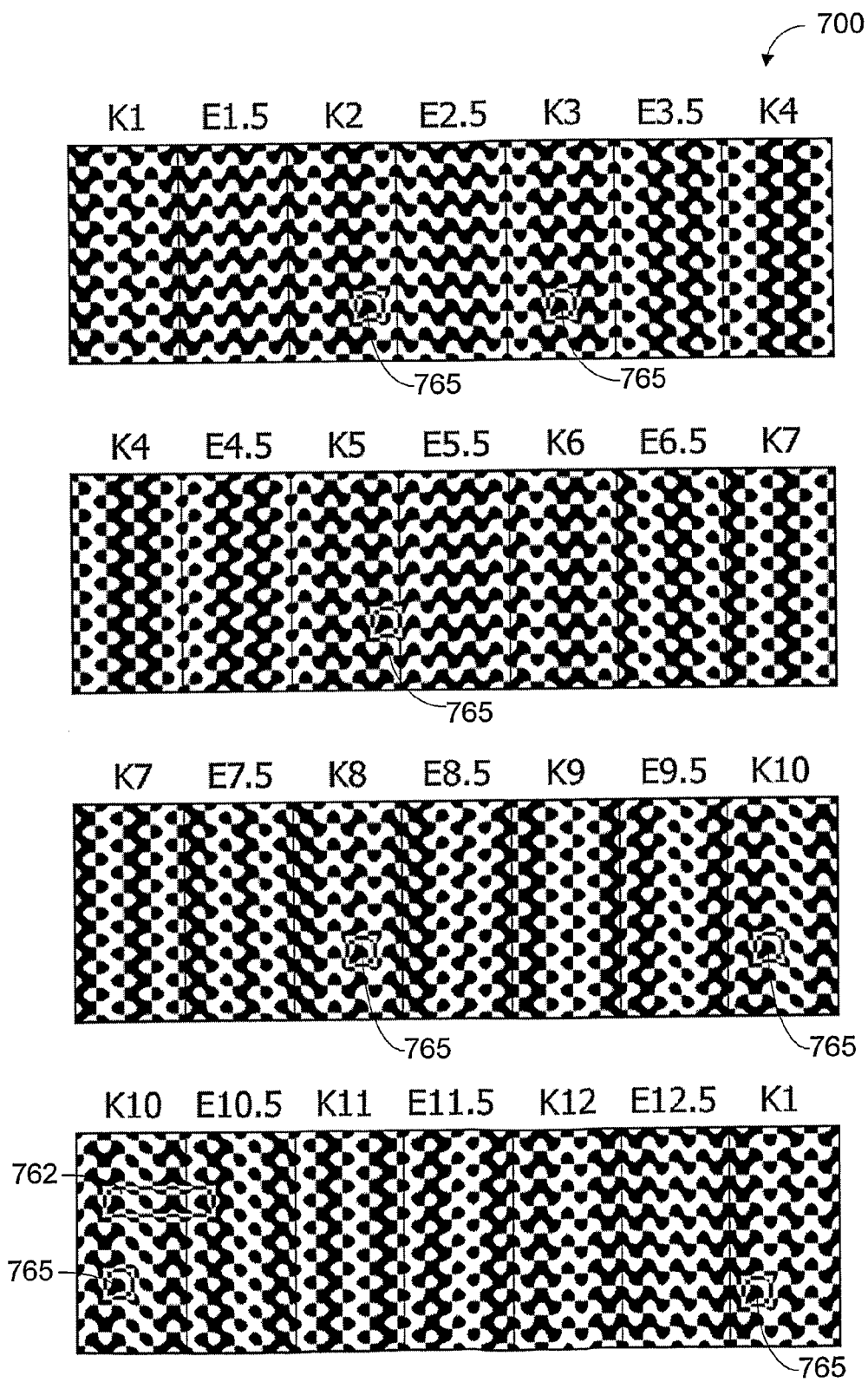
FIG. 7 is a schematic illustration of a sample set of twelve distinct binary patterns, each pattern being a predefined bi-dimensional pattern containing a predefined array of a finite set of identifiable feature types (such as maxima points, minima points, saddle points, corners, edges (e.g., double edges), and the like, while repeating predefined blocks at different lateral coordinates, according to an embodiment of the present invention.
Figure 9A:
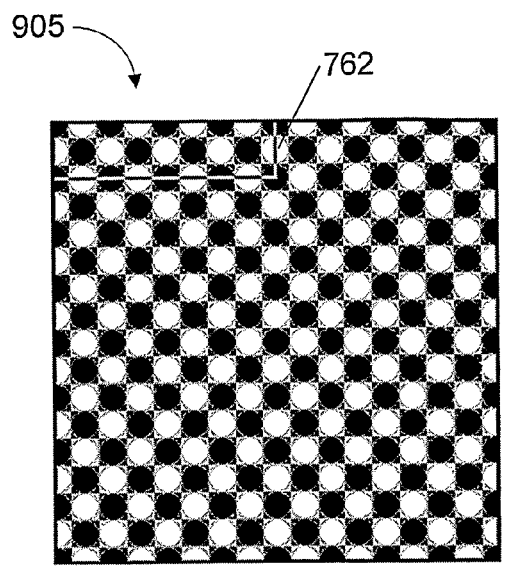
FIGS. 9A-9D are schematic illustrations of sample patterns, according to an embodiment of the present invention.
Figure 9B:
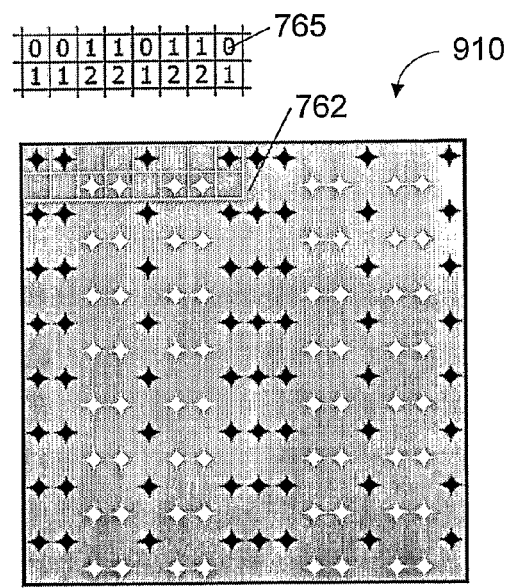
Figure 9C:
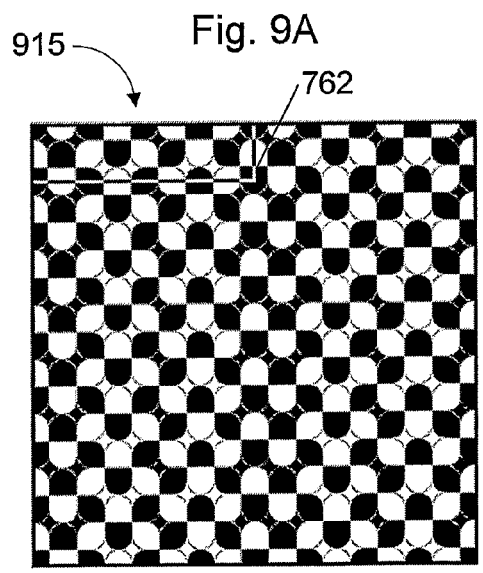
Figure 9D:
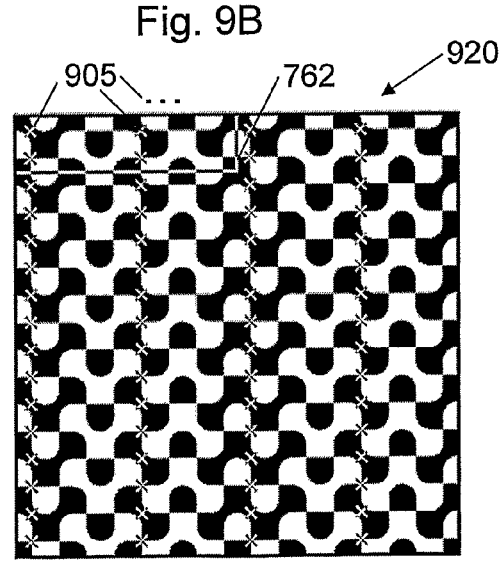

According to an embodiment of the present invention, FIG. 7 is a schematic illustration of a sample set of twelve distinct binary patterns 700, each pattern being a predefined bi-dimensional pattern containing a predefined array of a finite set of identifiable feature types, such as maxima points, minima points, saddle points, corners, edges (e.g., double edges, which are two edges relatively close one to another), and the like. The distinct binary patterns 700 include key-patterns $K_1$-$K_{12}$, and inter-patterns $E_{1.5}$-$E_{12.5}$ which are also referred to as energy-patterns. These inter-patterns $E_{1.5}$-$E_{12.5}$ are products of an averaging process between each pair of consecutive key-patterns. According to an embodiment of the present invention, each key-pattern is periodic as well as 2-fold radially symmetric. Thus, each key-pattern period consist of a 2-fold radially symmetric binary image, which tiles the pattern's plane. Such a key-pattern 920 appears, for example, in FIG. 9D. The top left rectangle 762 (e.g., representing M×N matrix, where M=8, N=2) indicates a single period, and the plurality of "x" marks 905 indicate radial symmetry centers of rotation. Each such tiling image is constructed by modulating a checkerboard pattern (the pattern 905, as shown for example on FIG. 9A), in accordance with said ternary M×N coding matrix 763, shown for example on FIG. 9B. Each ternary value affects a corresponding star-shaped region (star-shaped features) around each checkerboard junction of black and white squares. Ternary values "0" and "2" imply coloring the region in black and white, respectively, while "1" corresponds to keeping the checkerboard junction unmodified (as further seen on patterns 915 and 920, presented in FIGS. 9C and 9D respectively (e.g., on the top left rectangles 762 in said FIGS. 9C and 9D)). It should be noted that similar conventional modulation schemes can be found in the co-pending patent application WO 2008/062407.

Since each of the distinct P (e.g., P=12) key-patterns is derived from a distinct M×N ternary coding matrix, then each of the key-patterns $K_1$-$K_{12}$ may differ from one another by only the coloring of the star-shaped regions (as black/white star-shaped regions on pattern 910 in FIG. 9B), referred to as change regions. The remaining circular regions of said pattern 910, referred to as substantially non-change regions, are not modified by the codification (by using M×N ternary coding matrix 765, and thus are kept identical along the whole set of patterns 700.

According to an embodiment of the present invention, the M×N×P matrix is a volumetric ternary matrix, where M, N and P are integers (P is a number of predefined patterns). The values of the matrix can be predefined, for example, according to the following rules:
  a) For each U×V×P (for example, U=2, V=2) sub-matrix of the complete M×N×P matrix, any U×V cross-section matrix (such as sub-matrix 765) is unique. In other words, for any given lateral position in any of the P (twelve) key-patterns $K_1$-$K_{12}$, any U×V block appears only once, all along the pattern sequence (along the whole set of patterns 700). This implies that the process of pattern matching by correlation can rely on the U×V sized image blocks. Each such block can be matched, and thus provide the corresponding 3-D and range information. It should be noted that only axial U×V uniqueness is required, while repeating U×V blocks 765 at different lateral coordinates can also be performed, such as schematically presented on FIG. 7.
  b) For each U×V×P sub-matrix (subset) of the complete M×N×P matrix, an average matrix of any consecutive U×V cross-section matrices is also unique. In other words, the above rule (a) is extended to include inter-planar matching, resulting in obtaining more accurate 3D and range information.
  c) The ratio R between the sum of black and white areas in patterns is bounded to half ($R_{1-12}$=0.5±0), which also implies that this ratio substantially would not be varied along the pattern sequence (i.e., the variation rate is $A_{1-12}$=0±0). As a result, this complies with constant radiation energy constraints.
  d) The change between any two consecutive U×V blocks in the patterns can be bounded to a predefined number of change regions, such as to D=2±0 change regions. These changes are also limited by an additional set C of forbidden value changes, which consists of direct transitions from black to white color, and vice-versa. In other words, according to an embodiment of the present invention, transitions from black double edges to crossing white double edges (which cross one another) and vice-versa, are forbidden, while transitions from white or black double edges to saddle points (and vice-versa) are allowed. It should be noted that these rules comply with restricting the local energy changes both in terms of distribution density and uniformity, as well as local magnitude and rate. Thus, by properly predefining and controlling such energy changes, the energy-patterns $E_{1.5}$-$E_{12.5}$ become similar enough to key-patterns $K_1$-$K_{12}$, leading to relatively strong correlation between said energy and key patterns. On the other hand, said energy-patterns $E_{1.5}$-$E_{12.5}$ remain different enough from said key-patterns $K_1$-$K_{12}$ in order to still be able to determine their respective position between said key-patterns $K_1$-$K_{12}$. In addition, any two consecutive U×V blocks may include J assignments (e.g., J=1±0) of the ternary value "1", which are kept unchanged. This implies that checkerboard junction features always appear at a certain formation and density, throughout both key-patterns $K_1$-$K_{12}$ and inter-patterns $E_{1.5}$-$E_{12.5}$. It should be noted that junction features are known to provide relatively good localization, since they appear as saddle points in the acquired image (e.g., by means of imaging device 120 (FIG. 1)). Due to the local symmetry of said saddle points, such saddle points maintain their lateral position in the image plane relatively precisely, even under blur, and thus their sub-pixel lateral position could be detected in a relatively precise and consistent way. In an SOP configuration, this lateral position is fixed during normal operation. However, in a nearly SOP configuration, where imaging device 120 (FIG. 1) and projector 115 (FIG. 1) are separated apart, even slightly, the lateral position of the pattern (containing a predefined array of a finite set of identifiable feature types) reflected from object 130 (FIG. 1) varies relatively to the reflection range, and thus good feature localization is desired.

Also, it should be noted that in an SOP configuration, the sample pattern-set provides range data of surfaces, reflecting for example as little as U×V areas (such as U×V area 765) due to uniqueness of U×V code blocks within all P key-patterns and their derived inter-patterns. According to another embodiment of the present invention, extending these local uniqueness criteria may include, for example, the enforcement of uniqueness of a multiplicity of various block-sizes, as well as non-rectangular code formations.

According to still another embodiment of the present invention, each key-pattern (and each inter-pattern) is periodical due to code repetition of a single fundamental M×N ternary code matrix, and thus is descriptively compact. The code periodical repetition appears as translational symmetry in the pattern, where each fundamental tiling unit is rectangular. It should be noted that non-rectangular tilings, such as parallelogram-shaped tilings, obtained by appropriate repetition patterns, can also be used. It should be noted that according to another embodiment of the present invention, at least one key-pattern and/or at least one inter-pattern within a set (sequence) of patterns 700 is a non-periodic pattern.

According to still another embodiment of the present invention, constraining the M×N matrices to be 2-fold radially symmetric implies that the whole pattern-set is also 2-fold radially symmetric, thus belonging, for example, to conventional wallpaper group "p2". It should be noted that several beam shaping processes may benefit from such symmetry, enabling for example, designing the beam shaping diffractive optical element (such as phase mask 205 (FIG. 1)) in a more efficient and accurate way. Also, it should be noted that the above description compactness is further increased by such symmetry. Other symmetries may also be applied in a similar way, such as 3-fold and 6-fold radial symmetries, as well as reflection and glide symmetries (e.g., wallpaper groups "p4m" and "p31m").

According to a further embodiment of the present invention, for an SOP configuration, pattern-sequences derived from non-cyclic maximal paths are adequate as well. On the other hand, for a nearly SOP configuration, cyclic sequences may be preferred, as they beneficially allow repeating a whole P sequence more than once. Due to the non-coaxial projector/camera configuration, the repetitions do not introduce identification ambiguities, as each repeating identical code formation is imaged at a distinct location along a distinct unidirectional track, known as epipolar-line or epipolar curve. Thus, the position of coded pattern formations along the epipolar lines becomes part of the labeling format, further contributing to code description compactness. For example, more planes could be uniquely labeled, given the same local uniqueness specifications. Alternatively, smaller uniqueness areas, may maintain a given plane count.

It should be also noted that according to a still further embodiment of the present invention, in a nearly SOP configuration, achieving as much as possible P repetition is desirable, as it offers a means of optimizing the local uniqueness requirements, for example by offering smaller minimal matching formations (such as U×V blocks). Arranging the projector/camera position geometry in a proper way, offers means for optimizing the repetition distribution patterns, which will include image translations along predefined epipolar-lines. For this, for example, the optimization method as described in the co-pending patent application WO 2008/062407 can be used, enabling aligning the epipolar field at an optimized angle in relation to the pattern projection tilt angle, and the like. In addition, according to WO 2008/062407, it may be desirable to use elongated cyclically repeating matrices, referred to as preferred directional coding.

It should be noted that these optimizations also apply to conventional active-triangulation systems. Also, it should be noted that, in particular to the nearly SOP configuration, the preferred directional coding can be expanded to include inter-planer code repetitions in the preferred repetition direction. Also, in particular to the nearly SOP configuration, such repeating codes appear as distinct tracks along the epipolar-line, resembling dash-lines or dot-lines. Spacing and lengths of tracks are related closely to the distance between projector 115 and imaging device 120 (FIG. 1), as well as the axial spacing between the discrete key-pattern planes.

Figure 8A:
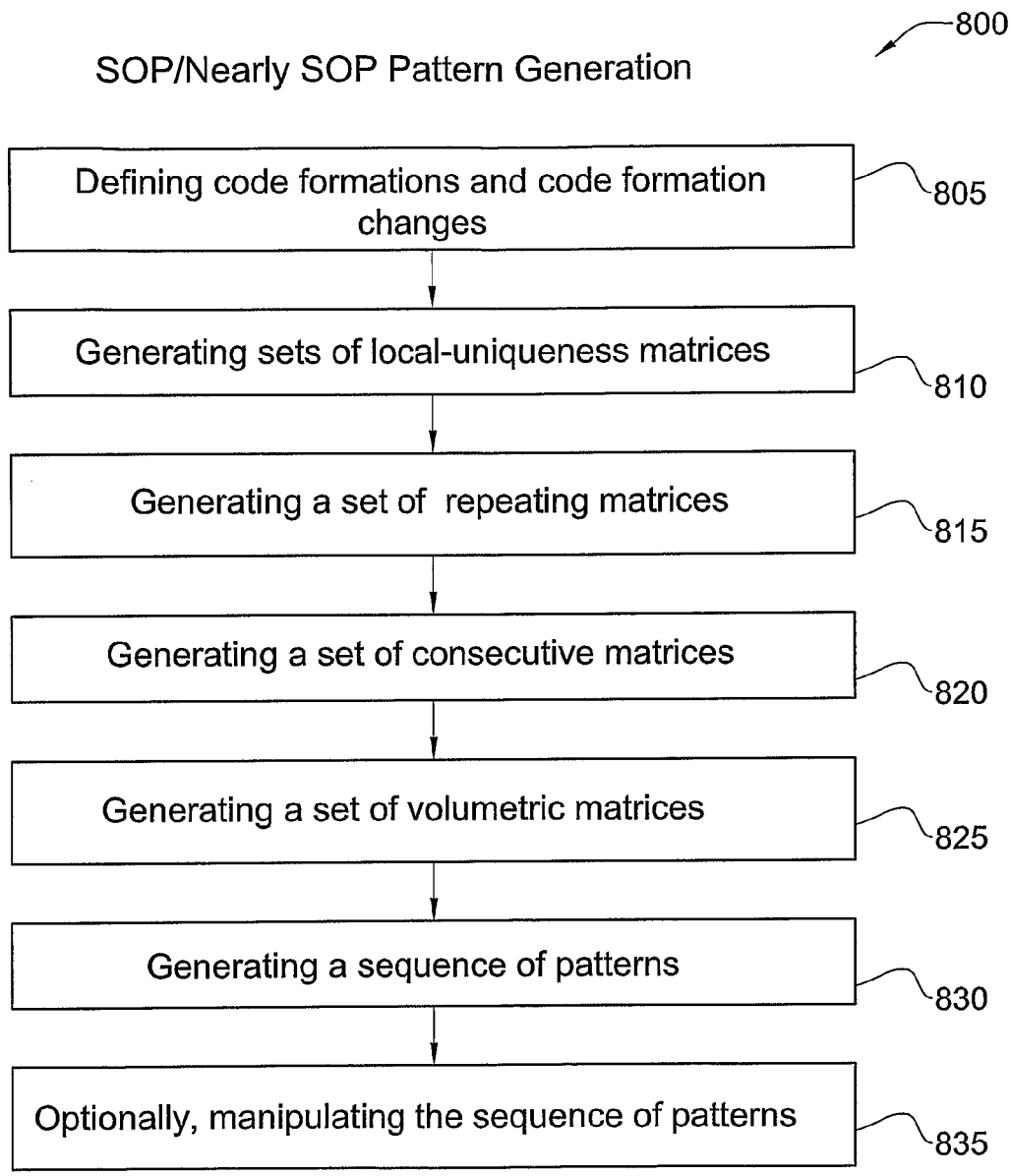
FIG. 8A is a schematic flow-chart of a SOP (Single Optical Path) pattern generation, according to an embodiment of the present invention.

FIG. 8A is a schematic flow-chart 800 of a SOP/nearly SOP pattern generation, according to an embodiment of the present invention. At step 805, the legal code formations and corresponding legal code formation changes are defined. It should be noted that the term "legal" means that this operation (of step 805) is performed according to a predefined set of rules, such as according to the above C, J, A, D, R parameters related, for example, to U×V blocks. Then, at step 810, one or more sets of valid local-uniqueness matrices (such as valid ternary U×V matrices, according to U, V and J values), containing only legal code formations, are generated. Also, it should be noted that the term "valid" corresponds to an outcome of a "legal" operation(s), according to the above predefined set of rules. After that, at step 815, a set of valid cyclically repeating matrices containing only legal local-uniqueness matrices, which may optionally have symmetries other than translational (such as valid 2-fold radially symmetric ternary M×N matrices, containing only the computed U×V matrices, according to M, N and R), is generated. The set of valid cyclically repeating consecutive matrices, containing only valid sequences of valid cyclically repeating matrices, according to legal code formation changes, is further generated at step 820. For example, the above valid consecutive matrices can be valid ternary M×N×T (T=2) matrices, which represent possible consecutive computed M×N matrices, according to the desired values of A, D and C, where A is a variation rate, D is a number of change regions, to which the change between any two consecutive U×V blocks is bounded, and C is a set of forbidden value changes between said any two consecutive U×V blocks. It should be noted that the set of valid consecutive matrices generated at this step does not contain any axial repetitions of both local-uniqueness matrices and averaged local-uniqueness matrices. Then, at step 825, a set of valid cyclically repeating volumetric matrices is generated, said repeating volumetric matrices complying with a set of predefined rules, such as containing only valid consecutive matrices and do not containing any axial repetitions of both local-uniqueness matrices and averaged local-uniqueness matrices. For example, the above volumetric matrices can be all valid P-maximal ternary M×N×P matrices, containing only the computed M×N×T matrices, and not containing any axial U×V repetitions. It should be noted that this step can be implemented as a search (e.g., exhaustive search) for a maximal length cyclic path in a graph, resembling the conventional process of generating De-Bruijn sequences by means of finding a Hamiltonian path (or equivalently, an Eulerian cycle) within a graph. The graph edges represent all valid pairings of possible consecutive M×N×T matrices, complying with the aforementioned axial uniqueness constraint. This constraint is also enforced during the path generation process itself, where it lessens the search-tree growth. Further, it should be noted that the set of the above volumetric matrices, at step 825, can be generated, for example, by searching for longest paths in said graph. Further, at step 830, a sequence of cyclically repeating patterns (e.g., key-patterns) is generated by modulating, for example, an underlying checkerboard pattern and by using a valid cyclically repeating volumetric matrix (such as a computed M×N×P matrix), according to a predefined coloring scheme.

Then, optionally at step 835, the sequence of patterns, generated at step 830, is manipulated by using, for example, conventional image processing techniques, such as blurring, binarization, convolution, deconvolution, carrier alternation, and the like.

It should be noted that according to another embodiments of the present invention, any other patterns can be generated, based on selecting corresponding values of the above-defined parameters U, V, J, M, N, R, T, A, D and C. Also, it should be noted that any of the above matrices and/or patterns, such as consecutive matrices, volumetric matrices, etc. can be either repeating (periodic) or non-repeating as well as cyclically repeating.

Figure 8B:
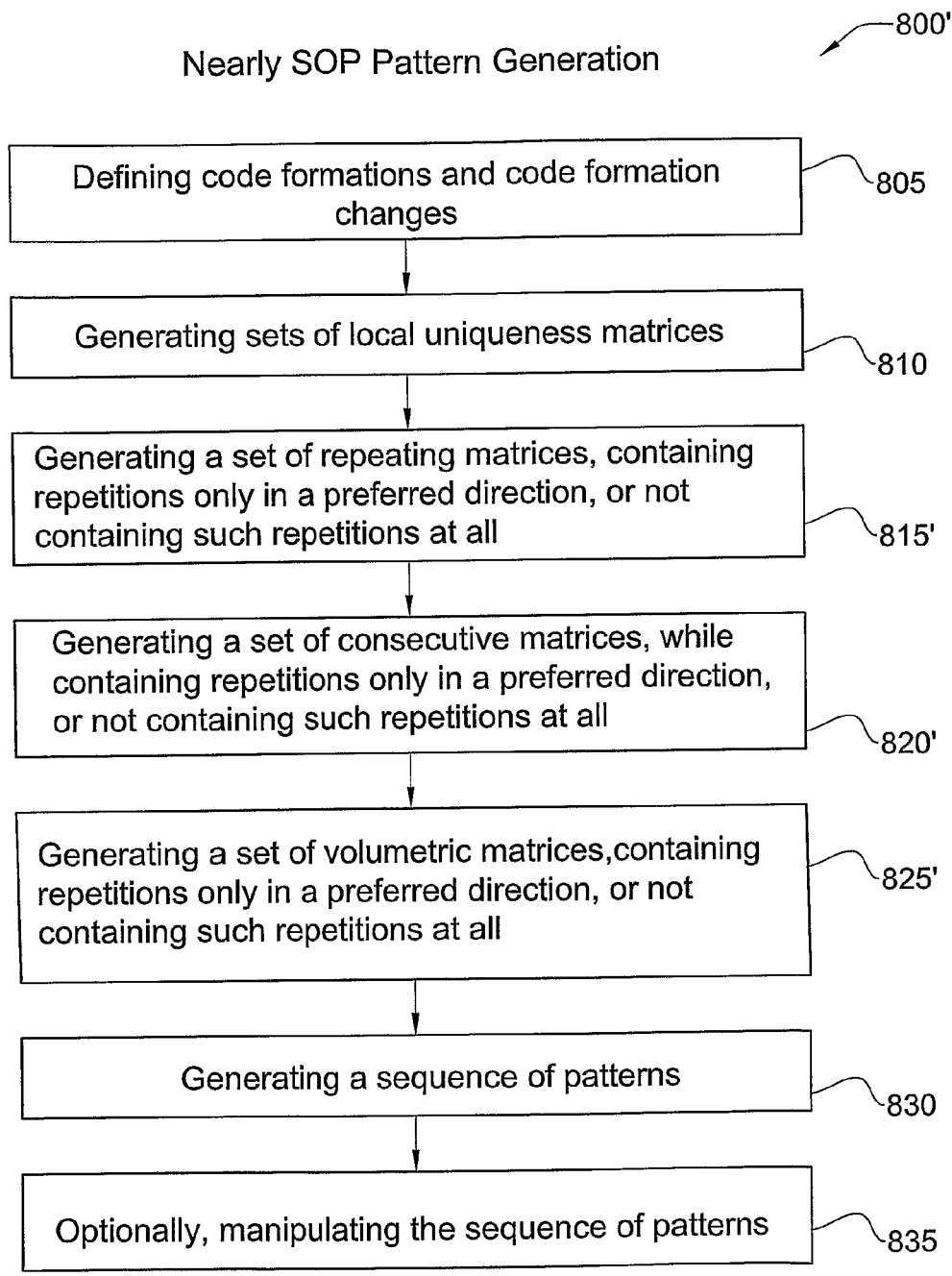
FIG. 8B is a schematic flow-chart of a nearly SOP pattern generation, according to another embodiment of the present invention.

FIG. 8B is a schematic flow-chart 800 of a nearly SOP pattern generation, according to another embodiment of the present invention. According to this embodiment, at step 815', a set of valid cyclically repeating matrices containing only legal local-uniqueness matrices, which may optionally have symmetries other than translational, while containing repetitions of local-uniqueness matrices only in a predefined (e.g., preferred) direction or, alternatively, containing no such repetitions at all, is generated. Then, the set of valid cyclically repeating consecutive matrices, containing only valid sequences of valid cyclically repeating matrices, according to legal code formation changes, is further generated at step 820'. According to this embodiment of the present invention, the above set of valid consecutive matrices does not contain any axial repetitions of both local-uniqueness matrices and averaged local-uniqueness matrices, while containing repetitions of both local-uniqueness matrices and averaged local-uniqueness matrices only in a predefined (e.g., preferred) direction, or alternatively containing no such repetitions at all. After this, at step 825', a set of valid cyclically repeating volumetric matrices is generated, said repeating volumetric matrices complying with a set of predefined rules, such as containing only valid consecutive matrices and do not contain any axial repetitions of both local-uniqueness matrices and averaged local-uniqueness matrices, while containing repetitions of both local-uniqueness matrices and averaged local-uniqueness matrices only in a predefined (e.g., preferred) direction, or alternatively, containing no such repetitions at all.

Figure 10A:
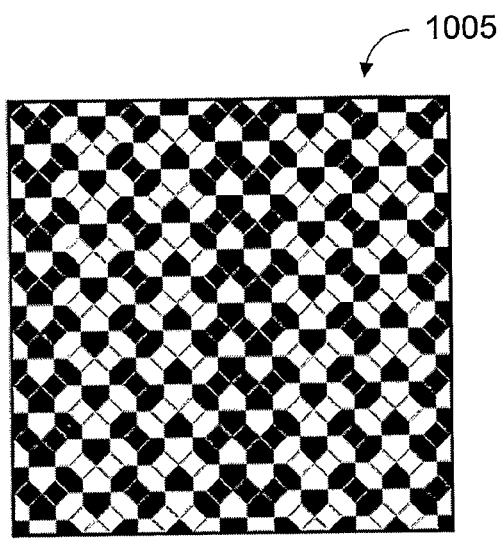
FIGS. 10A-10D are schematic illustrations of additional sample patterns, according to another embodiment of the present invention.

It should be noted that according to an embodiment of the present invention, in addition to setting of parameter D (the change between any two consecutive U×V blocks is bounded to D regions (e.g., D=2±0)) it is possible to further control the amount of inter-planar pattern change by means of coloring regions, having shapes other than the aforementioned stars, such as rhombuses as shown, for example, on pattern 1005 presented in FIG. 10A, and circles (not shown), consuming different change areas. In addition, it is also possible to use colors, other than black and white, such as grayscale colors, and the like.

Figure 10B:
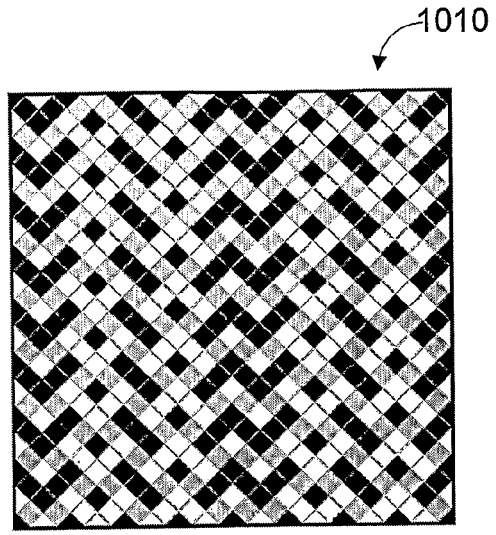

FIG. 10B is an illustration of an additional sample pattern 1010, according to another embodiment of the present invention. Pattern 1010 is a right angled rhombus pattern that is analogous to a conventional Cartesian pattern, rotated by 45°. Thus, by using rhombus coloring shapes and by substituting junction regions with uniformly colored grey rhombus regions, allows relatively compact pattern description, where each change and substantially non-change region is represented, for example, by a single pixel. This further reduces computations required during the beam-shaping design process of a beam-shaping diffractive optical element, such as phase mask 205 (FIG. 1).

It should be noted that using more than two coloring grey values may allow extending the code from a ternary base to a higher base (e.g., quaternary base, and the like), thus allowing for example the generation of more distinct planes or the reduction of the locally unique code formations.

Figure 10C:
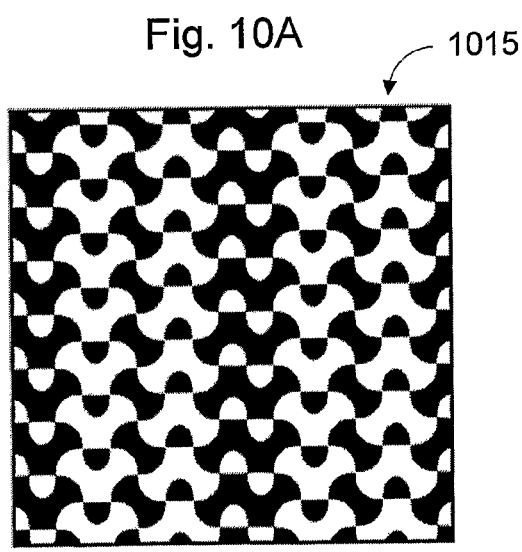

FIG. 10C is an additional illustration of another sample pattern 1015, according to still another embodiment of the present invention. Pattern 1015 contains modifications of shapes of the (colorized) areas in the pattern, such as smoothing and shifting edges of said shapes. This pattern demonstrates that any manipulations of patterns are possible, such as blur, binarization, convolutions, deconvolutions, and the like. This may help, for example, to achieve a more uniform average intensity in patterns and to improve the SNR in the pattern matching process, resulting in obtaining more accurate 3-D and range information.

Such pattern deformations are equivalent, for example, to using deformed non-Cartesian checkerboards as underlying patterns, as well as using non-uniform local change regions. Also, it should be noted that the previously substantially non-change regions (e.g., circles), as mentioned above, do change along the patterns sequence, in terms of both position and size.

Figure 10D:
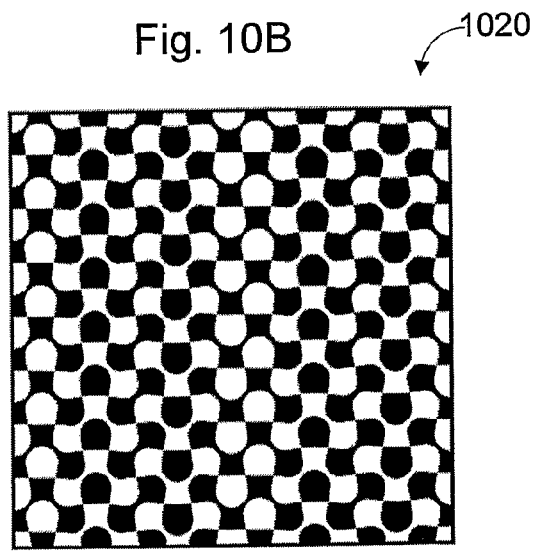

According to a further embodiment of the present invention, further manipulations of patterns are possible, such as manipulations presented in FIG. 10D, in addition to the pattern deformation of FIG. 10C, for example. In FIG. 10D, circles or ellipses of an opposite color are fitted to the previously substantially non-changing regions and replace these regions, while the colorizing of the code modulated areas is kept unchanged. This process, which can be referred to as carrier alternation, allows further balancing of the local average patterns intensity, as well as increasing the patterns contrast and the curvature of the color edges. It should be noted that by repeating the above manipulations of patterns (presented in FIGS. 10C and 10D) more than once, may further optimize these attributes, such as optimize the balancing of the patterns intensity, increase the patterns contrast, and the like.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A method of performing 3-D (three-dimensional) object profile inter-planar estimation and/or range inter-planar estimation of one or more objects within a scene, said method comprising:
  a) providing a predefined finite set of distinct types of features, giving rise to feature types, each feature type being distinguishable according to a unique bi-dimensional formation;
  b) providing a coded light pattern comprising multiple appearances of said feature types;
  c) projecting said coded light pattern, having axially varying intensity, on one or more objects within a scene, said scene having at least two planes, giving rise to a first plane and to a second plane;
  d) capturing a 2-D (two-dimensional) image of said objects having said projected coded light pattern projected thereupon, thereby giving rise to a captured 2-D image, said captured 2-D image comprising reflected said feature types;
  e) determining intensity values of the 2-D captured image, giving rise to the determined intensity values; and
  f) performing 3-D object profile inter-planar estimation and/or range inter-planar estimation of said one or more objects within said scene based on said determined intensity values.

2. The method according to claim 1, further comprising performing predefined computational operations based on the determined intensity values.

3. The method according to claim 1, further comprising providing the coded light pattern as one or more of the following:
  a) a periodic pattern; and
  b) a non-periodic pattern.

4. The method according to claim 2, wherein performing the predefined computational operations comprises correlating the intensity values to at least one predefined lookup table.

5. The method according to claim 2, wherein the performing predefined computational operations comprises calculating a peak ratio of the first and second planes of the scene.

6. The method according to claim 2, wherein performing predefined computational operations comprises calculating a Signal-to-Noise ratio $SNR_1$ at the first plane of the scene.

7. The method according to claim 2, wherein the performing predefined computational operations comprises calculating a Signal-to-Noise ratio $SNR_2$ at the second plane of the scene.

8. The method according to claim 2, further comprising determining a 3-D geometric shape of the one or more objects within the scene based on the predefined computational operations.

9. The method according to claim 4, further comprising determining two highest correlation values $MAX_1$ and $MAX_2$, said two highest correlation values being corresponding to the first and second planes of the scene, respectively.

10. The method according to claim 9, further comprising determining additional two highest correlation values $MIN_1$ and $MIN_2$, besides the determined $MAX_1$ and $MAX_2$ values, said two highest correlation values corresponding to the first and second planes of the scene, respectively.

11. The method according to claim 9, further comprising calculating the peak ratio of the first and second planes of the scene by dividing the highest correlation value $MAX_1$ on the highest correlation value $MAX_2$.

12. The method according to claim 10, further comprising calculating the Signal-to-Noise ratio $SNR_1$ at the first plane of the scene by dividing the highest correlation value $MAX_1$ on the $MIN_1$ value.

13. The method according to claim 10, further comprising calculating the Signal-to-Noise ratio $SNR_2$ at the second plane of the scene by dividing the highest correlation value $MAX_2$ on the $MIN_1$ value.

14. An apparatus configured to perform 3-D (three-dimensional) object profile inter-planar estimation and/or range inter-planar estimation of one or more objects within a scene, said apparatus comprising:
   a) a predefined set of types of features, giving rise to feature types, each feature type being distinguishable according to a unique bi-dimensional formation;
   b) a coded light pattern, having axially varying intensity, comprising multiple appearances of said feature types;
   c) a projector configured to project said coded light pattern on one or more objects within a scene, said scene having at least two planes, giving rise to a first plane and to a second plane;
   d) an imaging device configured to capture a 2-D (two-dimensional) image of said objects having said projected coded light pattern projected thereupon, giving rise to a 2-D captured image, said 2D image comprising reflected said feature types; and
   e) a processing unit configured to:
      e.1. determine intensity values of the 2-D captured image, giving rise to the determined intensity values; and
      e.2. perform 3-D object profile inter-planar estimation and/or range inter-planar estimation of said one or more objects within said scene by using the determined intensity values.

15. The apparatus according to claim 14, further comprising a diffractive optical element designed to enable projecting said coded light pattern toward said one or more objects.

16. The apparatus according to claim 15, wherein the diffractive optical element is a beam splitter.

17. The apparatus according to claim 14, wherein the projector further comprises a phase mask configured to enable obtaining corresponding intensity values on the 2-D image to be captured.

18. The apparatus according to claim 17, wherein the phase mask is a beam shaping diffractive optical element.

19. The apparatus according to claim 14, wherein the processing unit is further configured to perform predefined computational operations based on the determined intensity values.

20. The apparatus according to claim 19, wherein the processing unit is further configured to determine a 3-D geometric shape of the one or more objects within the scene based on the predefined computational operations.

21. The apparatus according to claim 14, wherein the processing unit is further configured to correlate the intensity values to at least one predefined lookup table.

22. The apparatus according to claim 14, wherein the processing unit is further configured to determine two highest correlation values $MAX_1$ and $MAX_2$, said two highest correlation values corresponding to the first and second planes of the scene, respectively.

23. The apparatus according to claim 22, wherein the processing unit is further configured to determine additional two highest correlation values $MIN_1$ and $MIN_2$, besides the determined $MAX_1$ and $MAX_2$ values, said two highest correlation values being corresponding to the first and second planes of the scene, respectively.

24. The apparatus according to claim 23, wherein the Signal-to-Noise ratio $SNR_1$ at the first plane of the scene is calculated by dividing the highest correlation value $MAX_1$ by the $MIN_1$ value.

25. The apparatus according to claim 23, wherein the Signal-to-Noise ratio $SNR_2$ at the second plane of the scene is calculated by dividing the highest correlation value $MAX_2$ by the $MIN_1$ value.

26. The apparatus according to claim 22, wherein the peak ratio of the first and second planes of the scene is calculated by dividing the highest correlation value $MAX_1$ by the highest correlation value $MAX_2$.

27. The apparatus according to claim 14, wherein the processing unit is further configured to calculate a peak ratio of the first and second planes of the scene.

28. The apparatus according to claim 14, wherein the processing unit is further configured to calculate a Signal-to-Noise ratio $SNR_1$ at the first plane of the scene.

29. The apparatus according to claim 14, wherein the processing unit is further configured to calculate a Signal-to-Noise ratio $SNR_2$ at the second plane of the scene.

30. The apparatus according to claim 14, wherein the coded light pattern is one or more of the following:
   a) a periodic pattern; and
   b) a non-periodic pattern.

31. The apparatus according to claim 14, wherein the processing unit is provided within the imaging device.

32. A system configured to perform 3-D (three-dimensional) object profile inter-planar estimation and/or range inter-planar estimation of one or more objects within a scene, said system comprising:
   a) a pattern-projecting apparatus configured to project a bi-dimensional coded light pattern, having axially varying intensity and having a plurality of feature types onto one or more objects within a scene having at least two planes, such that each feature reflects from a respective reflection location of the object within said scene, giving rise to a reflected feature, said feature types being distinguishable according to a unique bi-dimensional formation;
   b) an imaging device configured to capture a 2-D (two-dimensional) image of said scene comprising the reflected features; and c) a processing unit configured to:
  c.1. determine intensity values of the 2-D captured image, giving rise to the determined intensity values; and
  c.2. perform 3-D object profile inter-planar estimation and/or range inter-planar estimation of said one or more objects within said scene by making use of the determined intensity values.

33. The system according to claim 32, wherein the pattern-projecting apparatus further comprises a projector configured to project the coded light pattern on the one or more objects within the scene.

34. The system according to claim 32, further comprising a diffractive optical element designed to enable projecting said coded light pattern toward said one or more objects.

35. The system according to claim 34, wherein the diffractive optical element is a beam splitter.

36. The system according to claim 32, wherein the pattern-projecting apparatus further comprises a phase mask configured to enable obtaining corresponding intensity values on the 2-D image to be captured.

37. The system according to claim 36, wherein the phase mask is a beam shaping diffractive optical element.

38. The system according to claim 32, wherein the processing unit is further configured to perform predefined computational operations based on the determined intensity values.

39. The system according to claim 38, wherein the processing unit is further configured to determine a 3-D geometric shape of the one or more objects within the scene based on the predefined computational operations.

40. The system according to claim 32, wherein the processing unit is further configured to correlate the intensity values to at least one predefined lookup table.

41. The system according to claim 32, wherein the processing unit is further configured to calculate a peak ratio of the first and second planes of the scene.

42. The system according to claim 32, wherein the processing unit is further configured to calculate a Signal-to-Noise ratio $SNR_1$ at the first plane of the scene.

43. The system according to claim 32, wherein the processing unit is further configured to calculate a Signal-to-Noise ratio $SNR_2$ at the second plane of the scene.

44. The system according to claim 32, wherein the coded light pattern is one or more of the following:
  a) a periodic pattern; and
  b) a non-periodic pattern.

45. The system according to claim 32, wherein the processing unit is provided within the imaging device.

46. A method of generating a sequence of SOP (Single-Optical-Path) or nearly SOP patterns, said method comprising modulating a predefined pattern and using at least one of volumetric matrices, each of said volumetric matrices complying with one or more predefined rules.

47. The method according to claim 46, further comprising manipulating the sequence of patterns by using image processing.

48. The method according to claim 46, further comprising providing the volumetric matrices as one or more of the following:
  a) a repeating matrices; and
  b) a non-repeating matrices.

49. A method of generating a sequence of SOP (Single-Optical-Path) or nearly SOP patterns, said method comprising:
  a) defining code formations and corresponding code formation changes;
  b) generating one or more sets of local-uniqueness matrices, containing only said code formations;
  c) generating at least one set of matrices containing only said local-uniqueness matrices;
  d) generating at least one set of consecutive matrices, containing only sequences of said matrices, according to said code formation changes, while said at least one set of the consecutive matrices does not contain any axial repetitions of both local-uniqueness matrices and averaged local-uniqueness matrices;
  e) generating at least one set of volumetric matrices, while said volumetric matrices containing only said consecutive matrices and not containing any axial repetitions of both local-uniqueness matrices and averaged local-uniqueness matrices; and
  f) generating a sequence of patterns by modulating a predefined pattern and using at least one of said repeating volumetric matrices.

50. The method according to claim 49, further comprising manipulating the sequence of patterns by using image processing.

51. The method according to claim 49, further comprising providing the matrices with symmetries other than translational.

52. The method according to claim 49, further comprising generating, for obtaining the sequence of nearly SOP patterns, the at least one set of the matrices that comprises repetitions of the local-uniqueness matrices in a predefined direction or do not comprise said repetitions.

53. The method according to claim 49, further comprising generating, for obtaining the sequence of nearly SOP patterns, the at least one set of the consecutive matrices that comprises repetitions of the both local-uniqueness matrices and averaged local-uniqueness matrices in a predefined direction or do not comprise said repetitions.

54. The method according to claim 49, further comprising generating, for obtaining the sequence of nearly SOP patterns, the at least one set of volumetric matrices that comprises repetitions of the both local-uniqueness matrices and averaged local-uniqueness matrices in a predefined direction or do not comprise said repetitions.

* * * * *